United States Patent [19]

Schweitzer, III

[11] Patent Number: 5,115,226
[45] Date of Patent: May 19, 1992

[54] RELAY FOR DETECTING A CURRENT DISTURBANCE AND ASSERTING AN OUTPUT

[75] Inventor: Edmund O. Schweitzer, III, Whitman County, Wash.

[73] Assignee: Schweitzer Engineering Laboratories, Inc., Pullman, Wash.

[21] Appl. No.: 420,551

[22] Filed: Oct. 12, 1989

[51] Int. Cl.⁵ ............................................. G08B 21/00
[52] U.S. Cl. ............................... 340/664; 340/657; 361/94; 307/152
[58] Field of Search .............. 340/664, 658, 644, 638, 340/657; 361/93, 94, 96, 100; 307/43, 44, 152

[56] References Cited

U.S. PATENT DOCUMENTS

| | | | |
|---|---|---|---|
| 4,297,741 | 10/1981 | Howell | 361/96 X |
| 4,305,108 | 12/1981 | Udren | 361/96 |
| 4,707,761 | 11/1987 | Podobiniski | 361/63 X |
| 4,796,148 | 1/1989 | Ruta | 361/96 X |

Primary Examiner—Donnie L. Crosland
Assistant Examiner—Jeffery A. Hofsass
Attorney, Agent, or Firm—Heller, Ehrman, White & McAuliffe

[57] ABSTRACT

An apparatus for detecting a power system disturbance. The apparatus may be a current rate-of-change relay for qualifying system-separation transfer-trip commands.

21 Claims, 21 Drawing Sheets

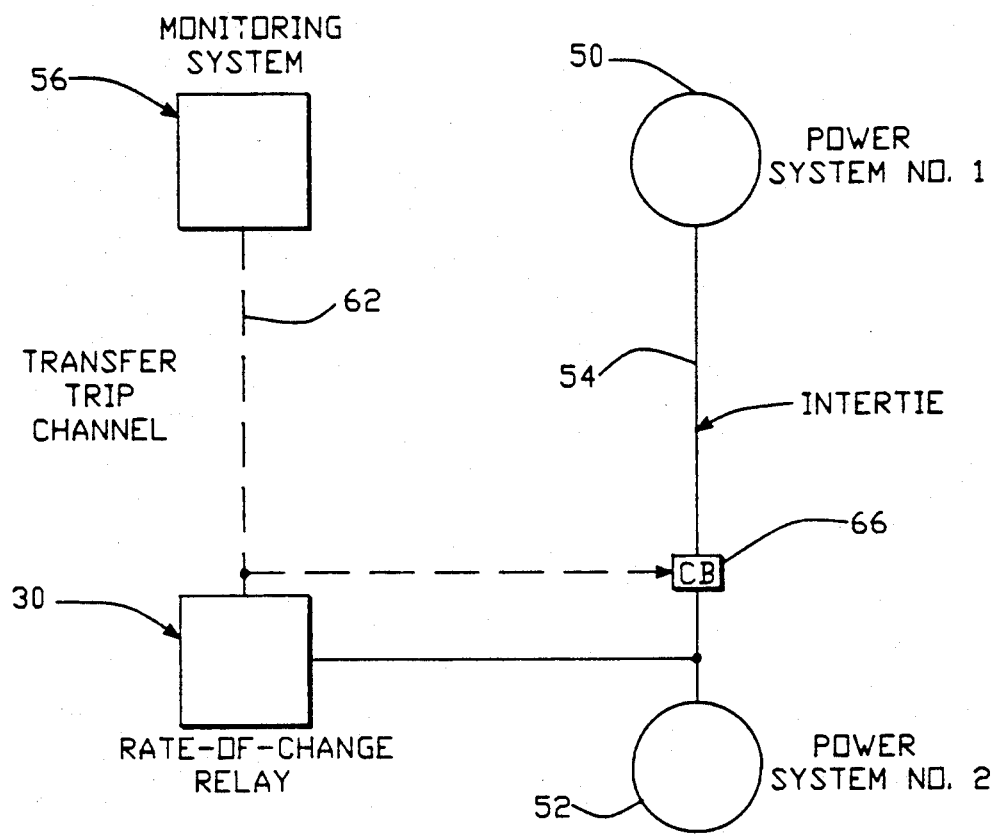
FIG.—1
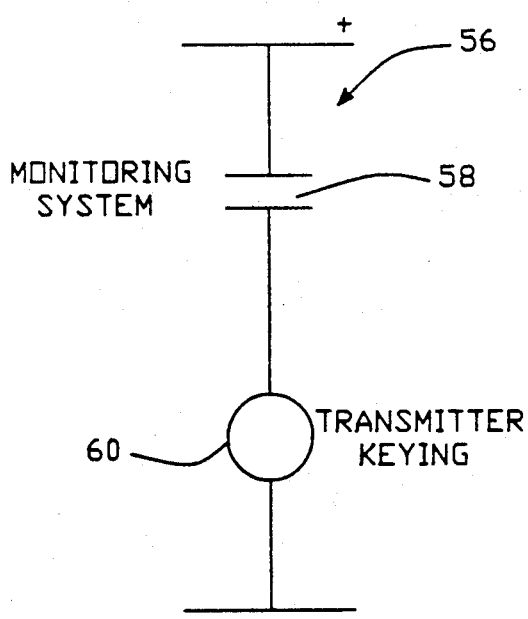
FIG.—1A
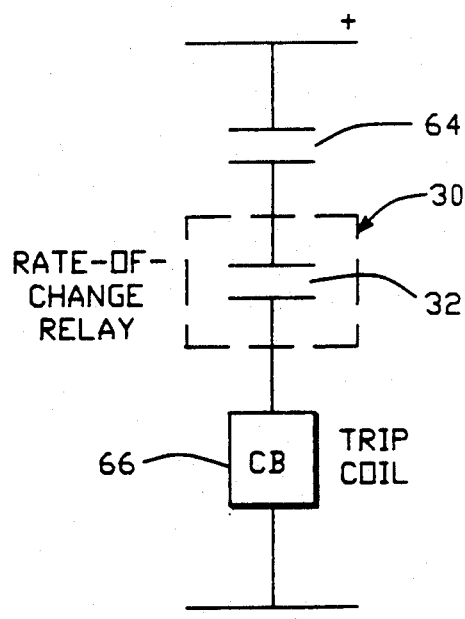
FIG.—1B

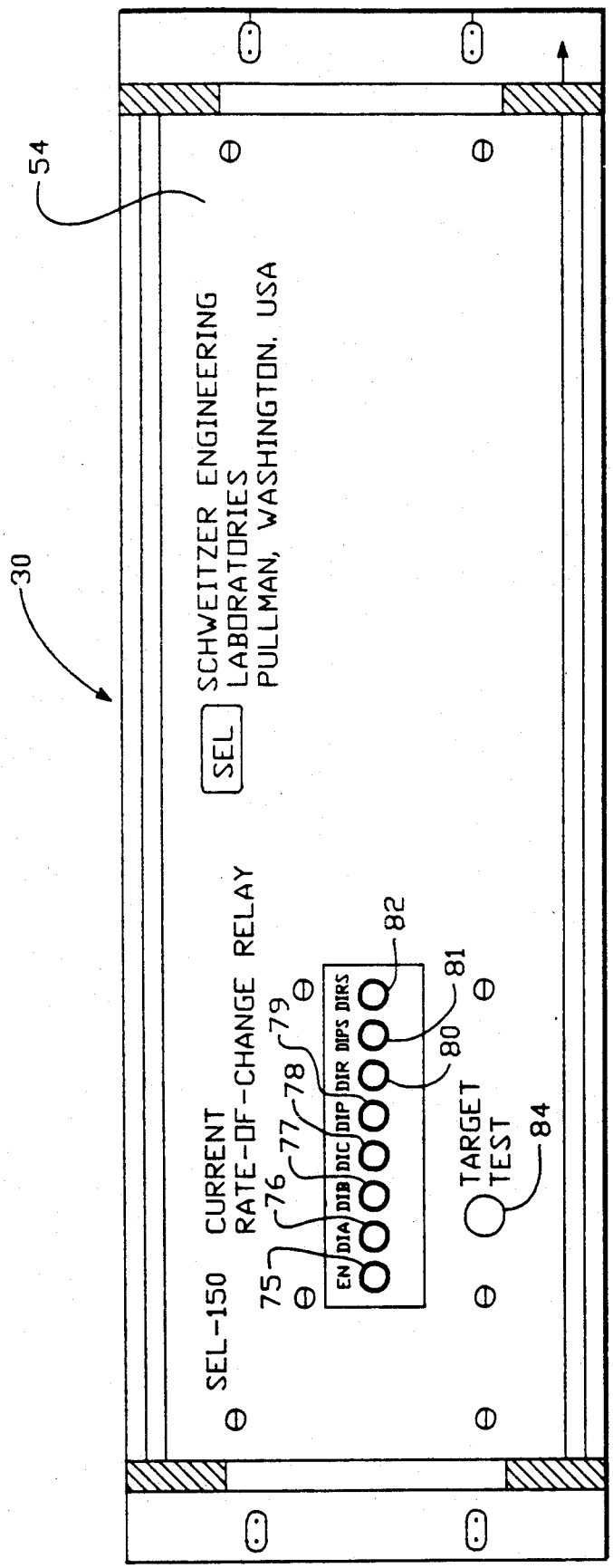
FIG.—4

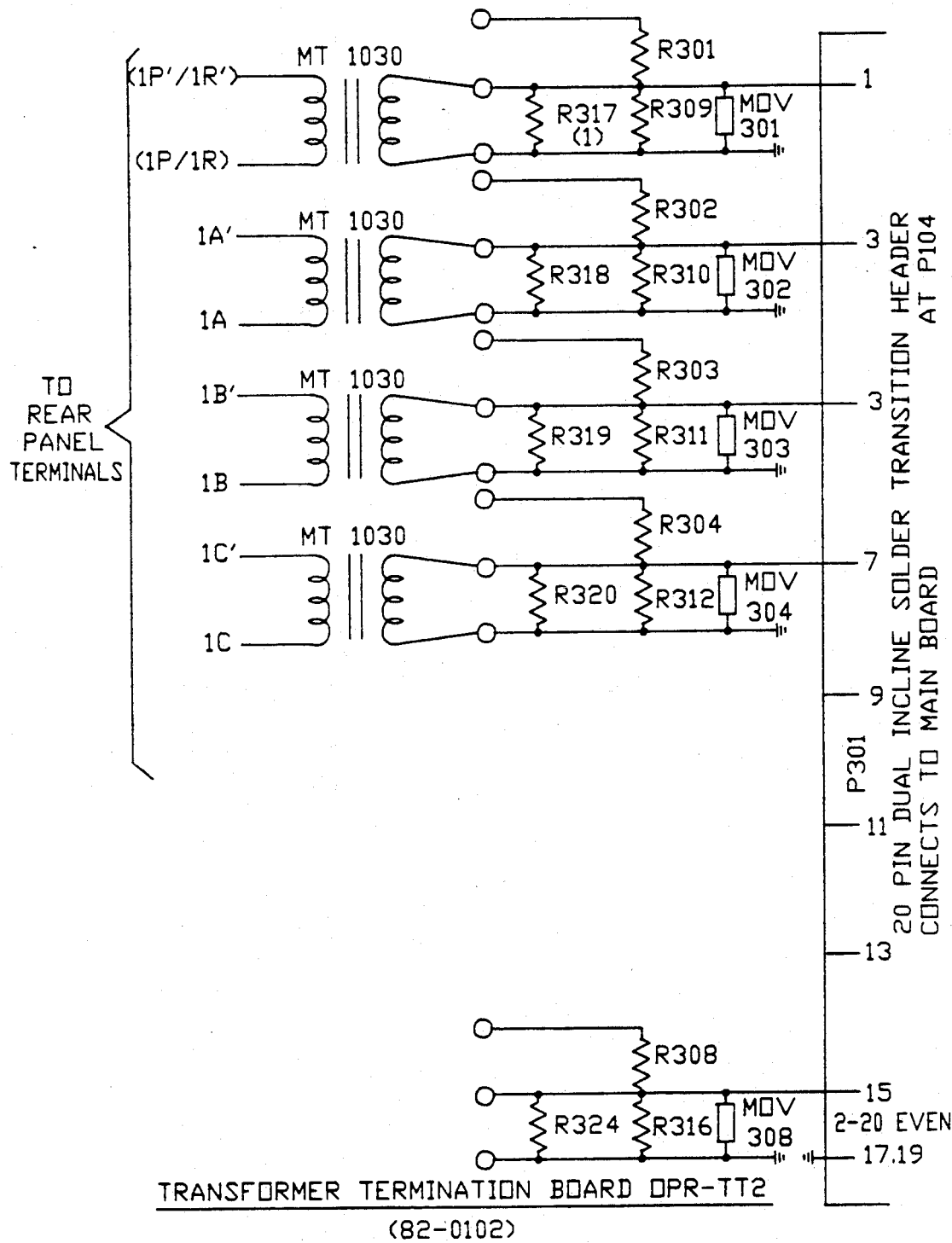
FIG.—5B

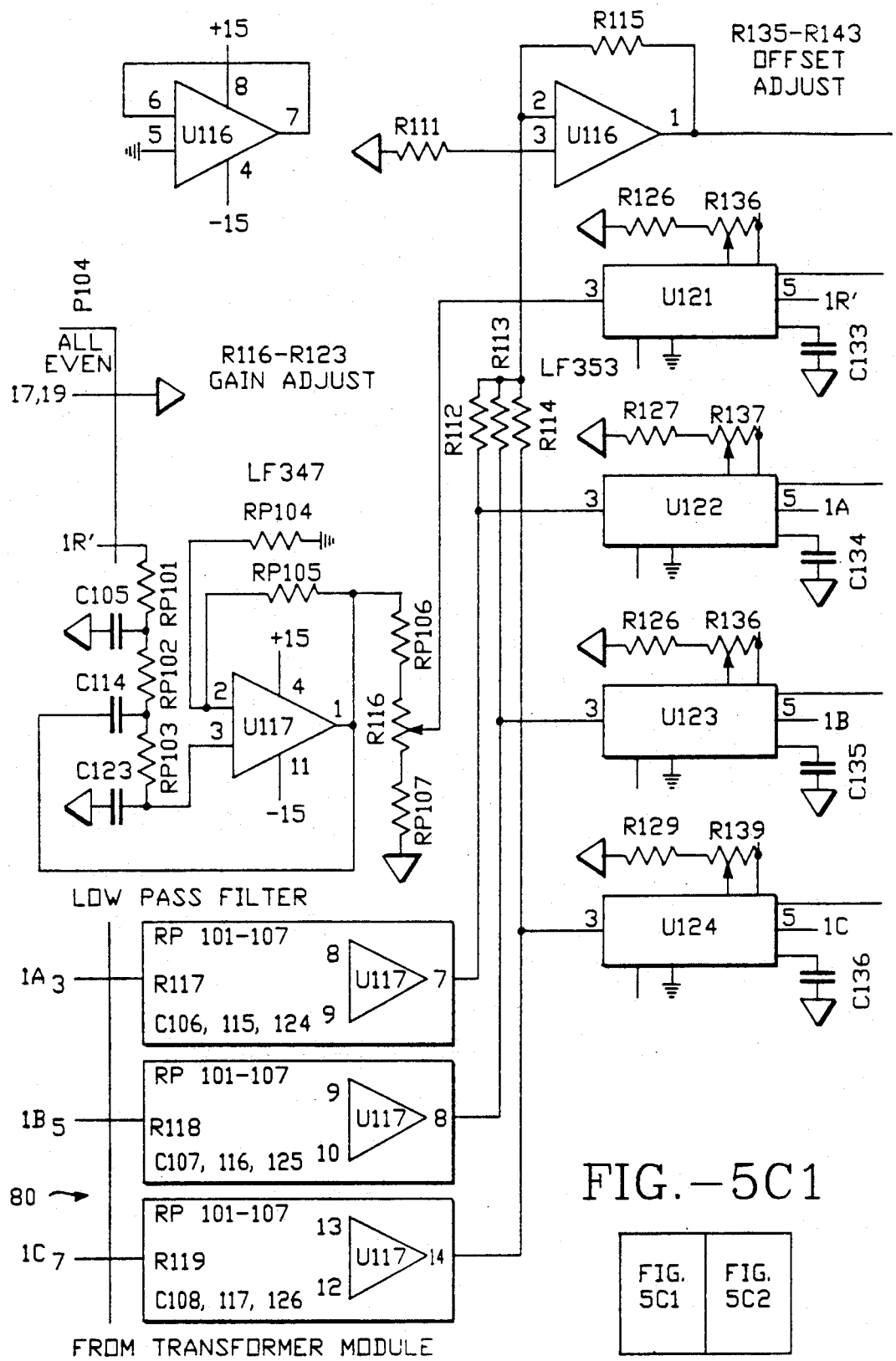
FIG.-5C1

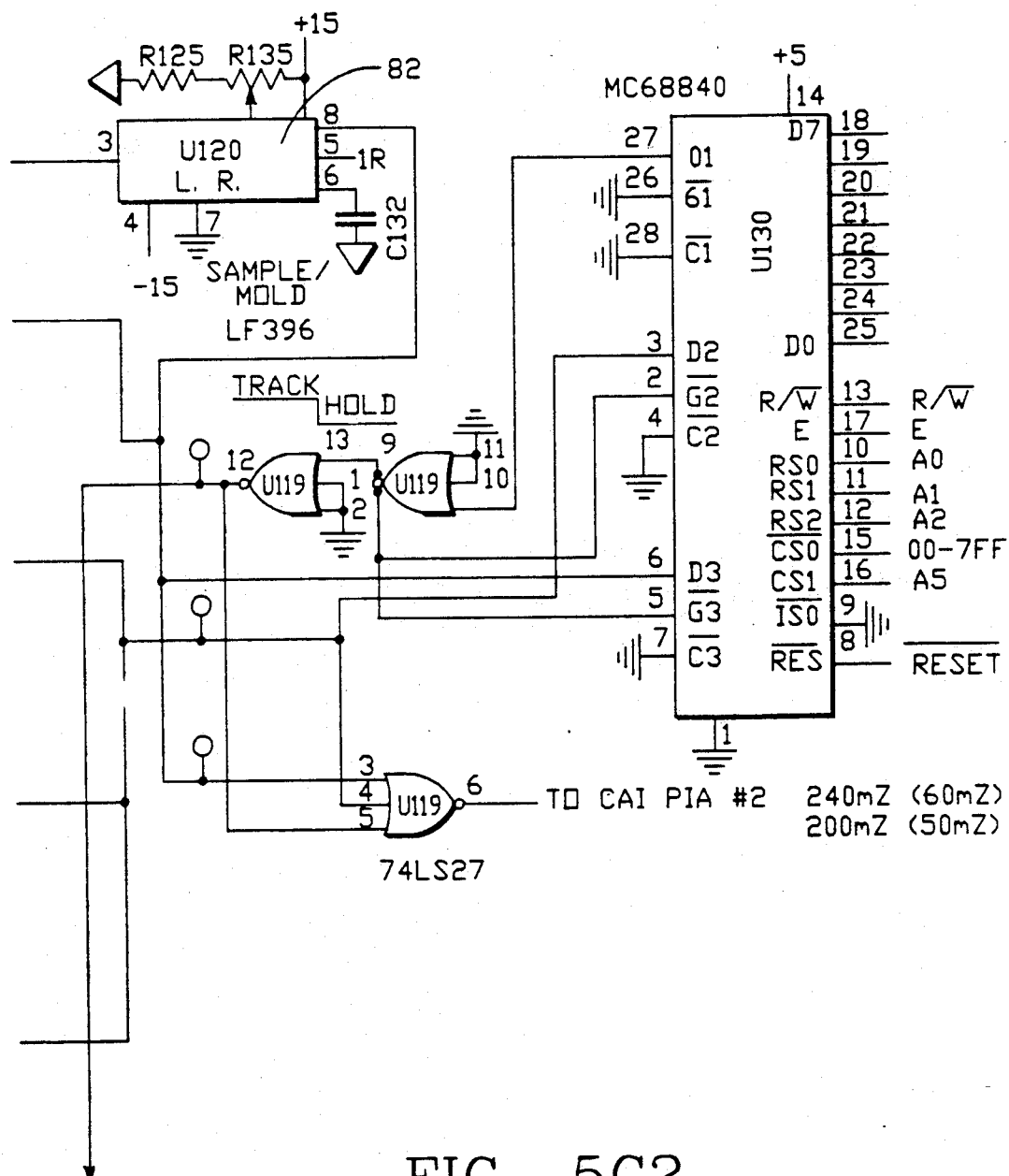
FIG.-5C2

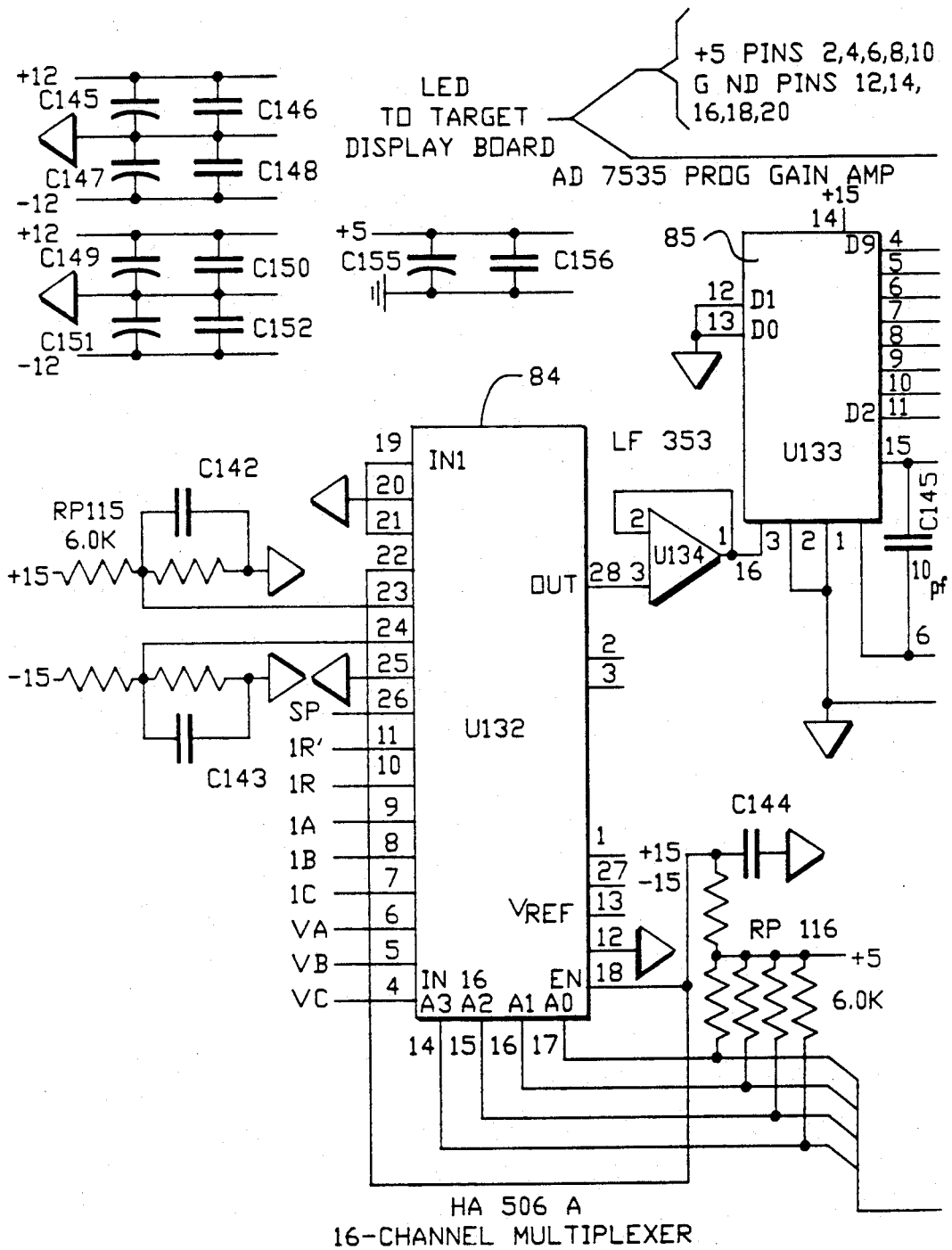
FIG.–5D1

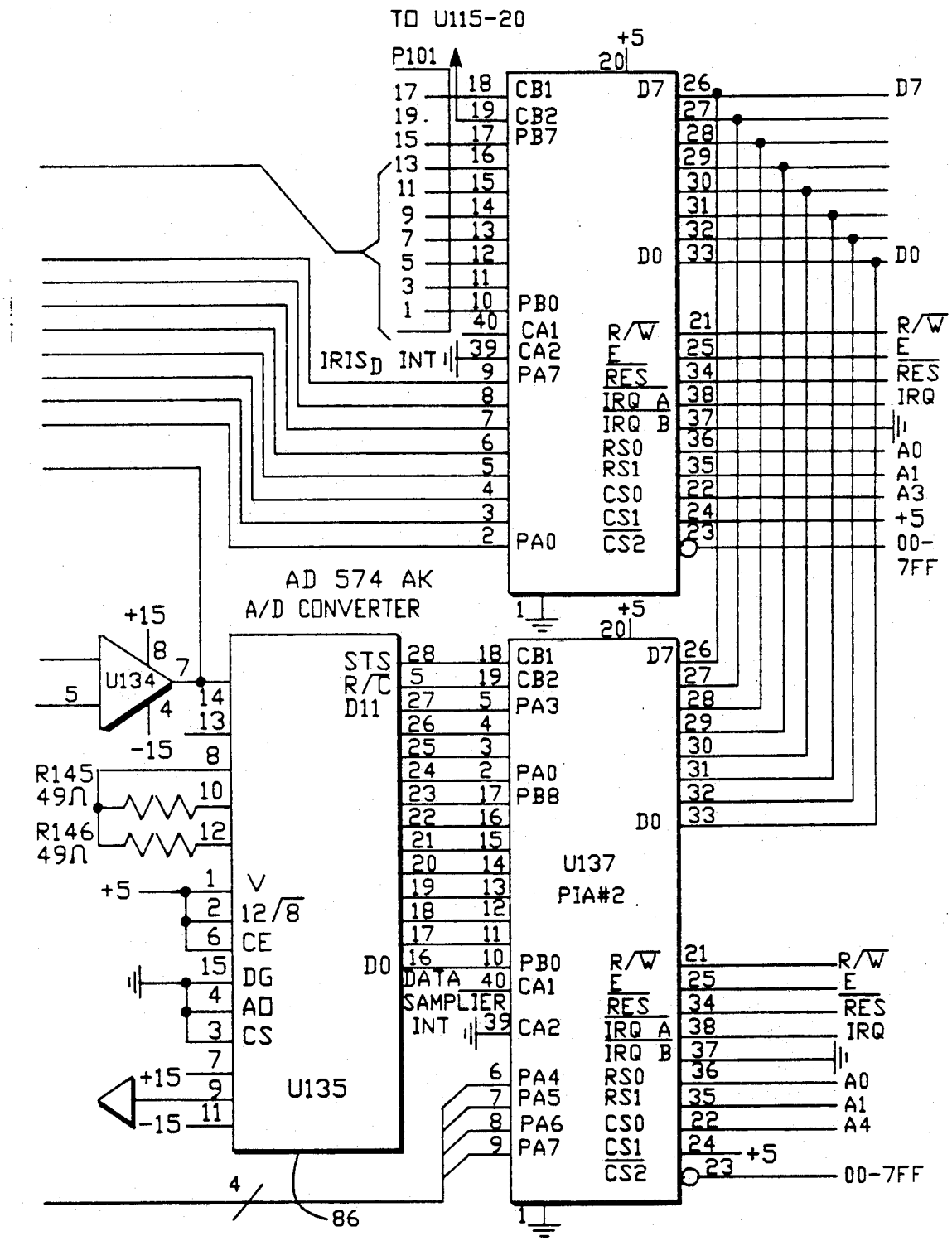
FIG.-5D2

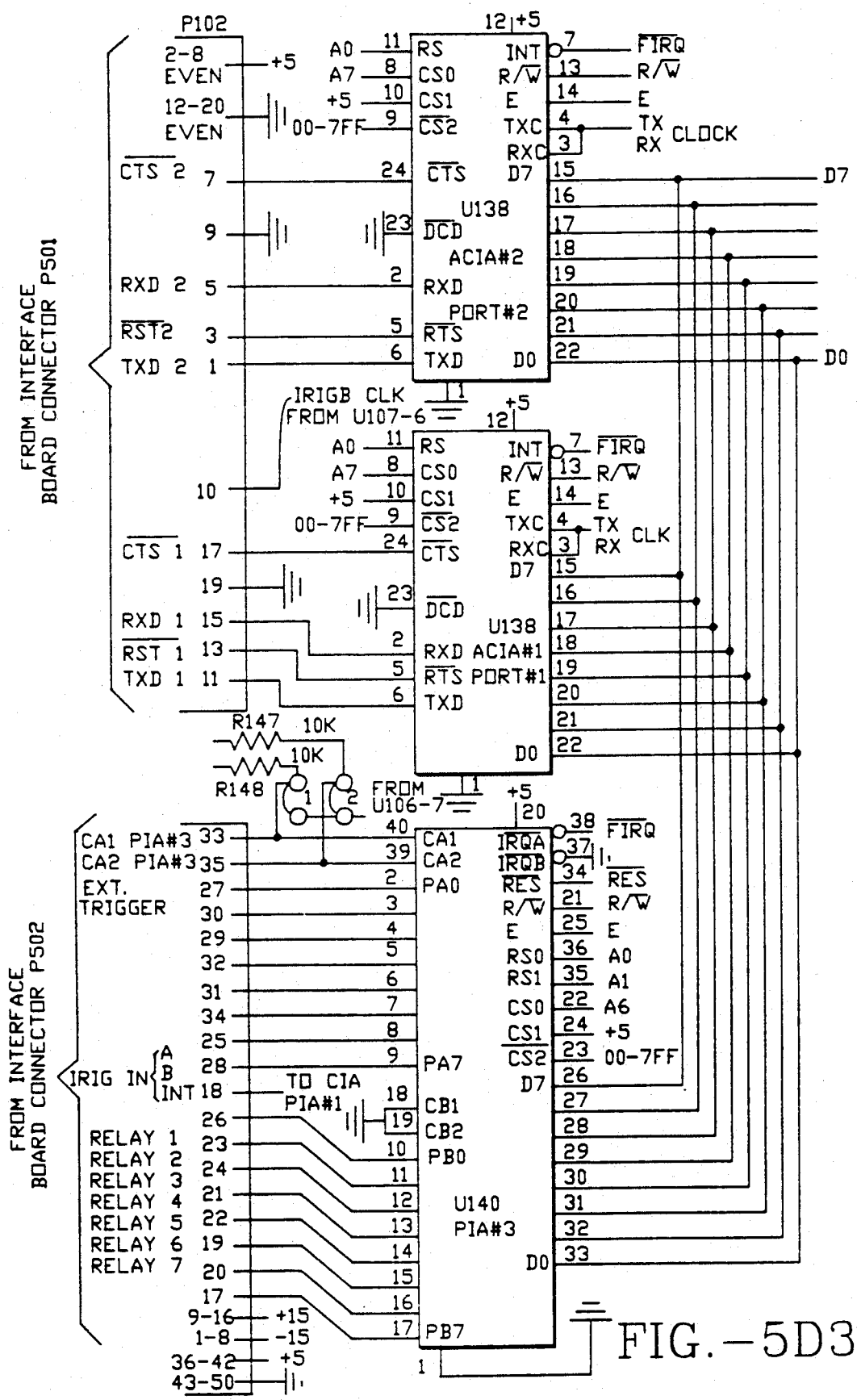
FIG.-5D3

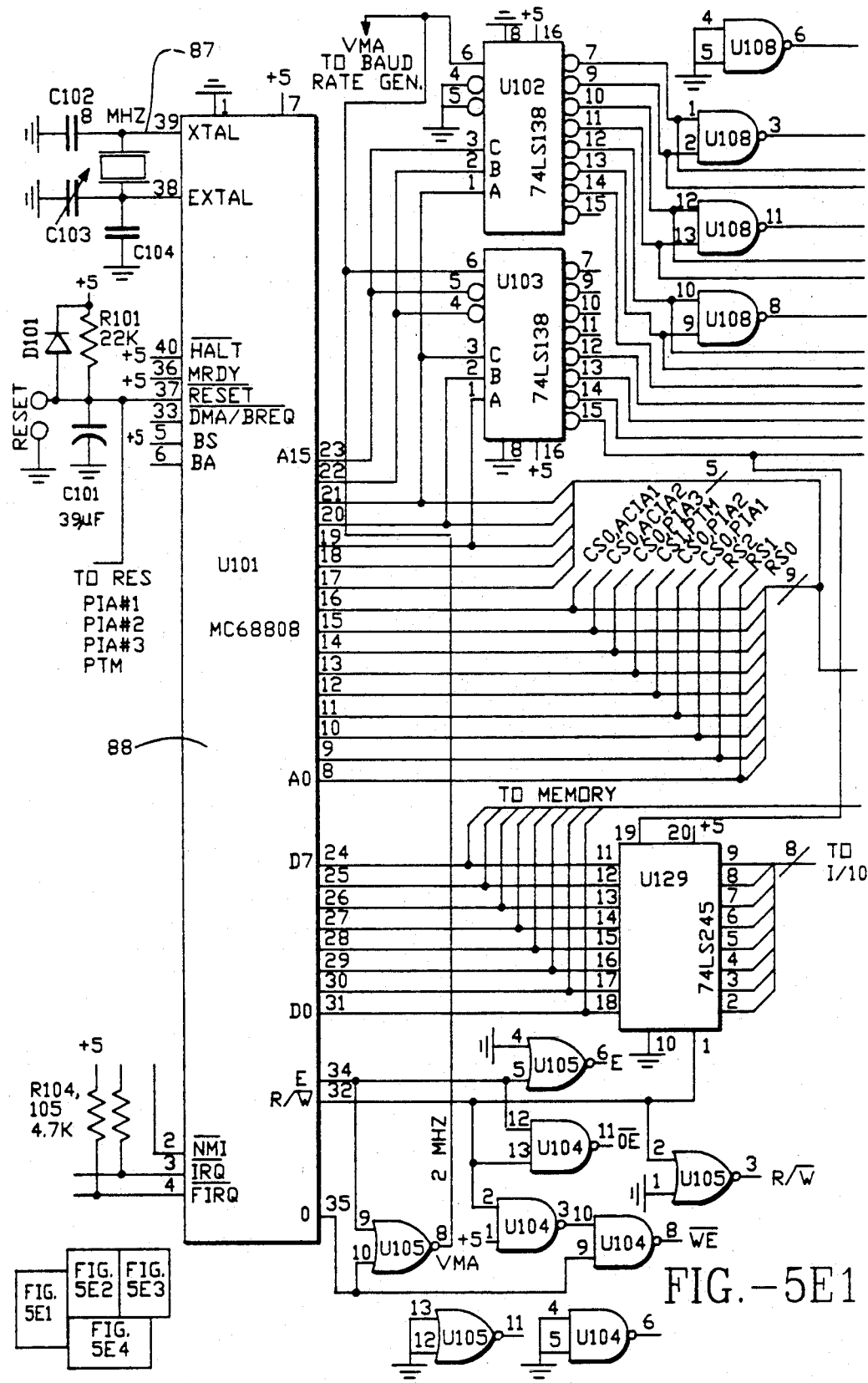
FIG.-5E1

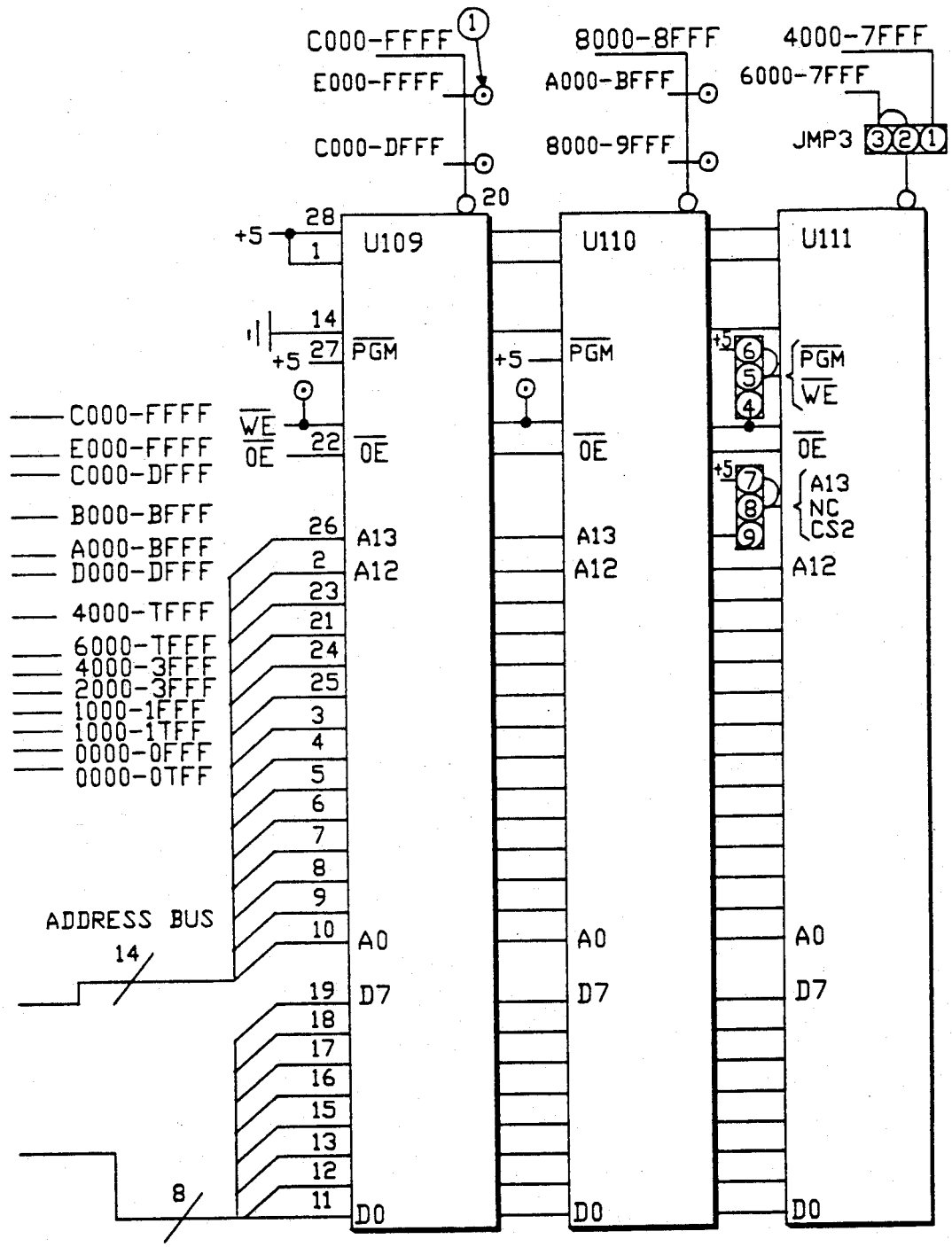
FIG.-5E2

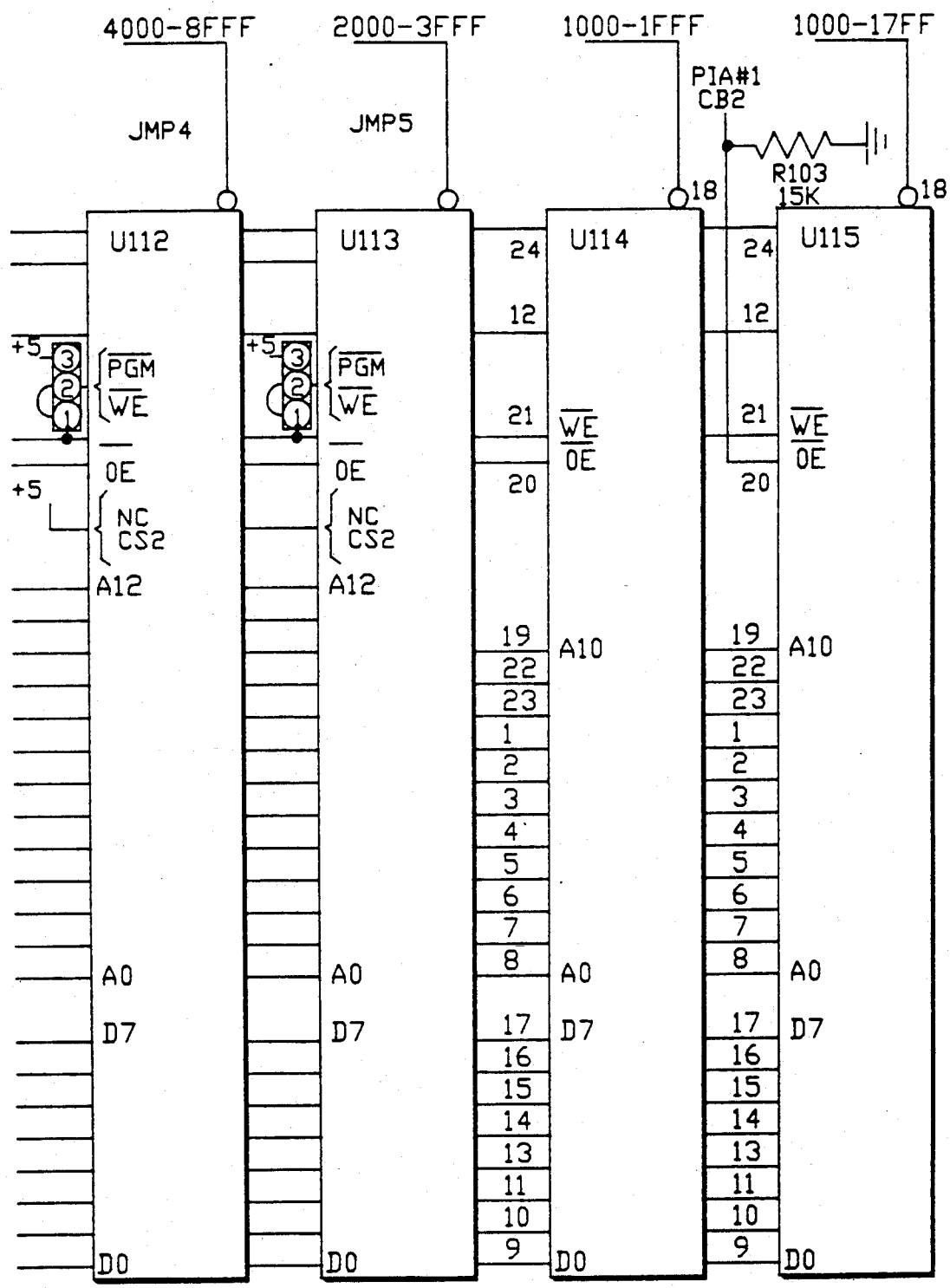
FIG.-5E3

MEMORY CONFIGURATION

THIS TABLE GIVES THE DIFFERENT MEMORY OPTIONS AVAILABLE. THE NUMBERS IN ROM PARENTHESES REPRESENT THE JUMPER PINS TO BE SHORTED FOR EACH OPTION.

NO TWO DEVICES MAY SHARE THE SAME ADDRESS SPACE.

① ⊙ THESE POINTS ACCESSABLE ON U108 AND U109 FOR PROTO 8K RAM DECODE

STANDARD JUMPERS SHOWN FOR:
U109, U110 27128 ROM
U111 2764 ROM
U112, U113 6264 RAM

| Address | ROM | | | | | RAM | | |
|---|---|---|---|---|---|---|---|---|
| 0000 | | | | | | ✕ | | |
| 0FFF | | | | | | | | |
| 1000 | | | | | | | U115 2K EPROM | |
| 17FF | | | | | | | | |
| 1800 | | | | | | U114 2K RAM | | |
| 1FFF | | | | | | | | |
| 2000 | | | U111 16K EPROM (1-2, 5-6, 8-9) JMP3 | U113 8K EPROM (2-3) JMP5 | | U113 8K EPRAM (1-2) JMP5 | | |
| 3FFF | | | | | | | | |
| 4000 | | | | U112 8K EPROM (2-3) JMP4 | | U112 8K EPRAM (1-2) JMP4 | | |
| 5FFF | | | | | | | | |
| 6000 | | | | U111 8K EPROM (2-3, 4-5, 7-8) JMP3 | | U111 8K EPRAM (2-3, 4-5, 7-8) JMP3 | | |
| 7FFF | | | | | | | | |
| 8000 | U109 16K EPROM | U110 16K EPROM | | | | ✕ | | |
| BFFF | | | | | | | | |
| C000 | | | | | | | | |
| FFFF | | | | | | | | |

FIG.—5E4

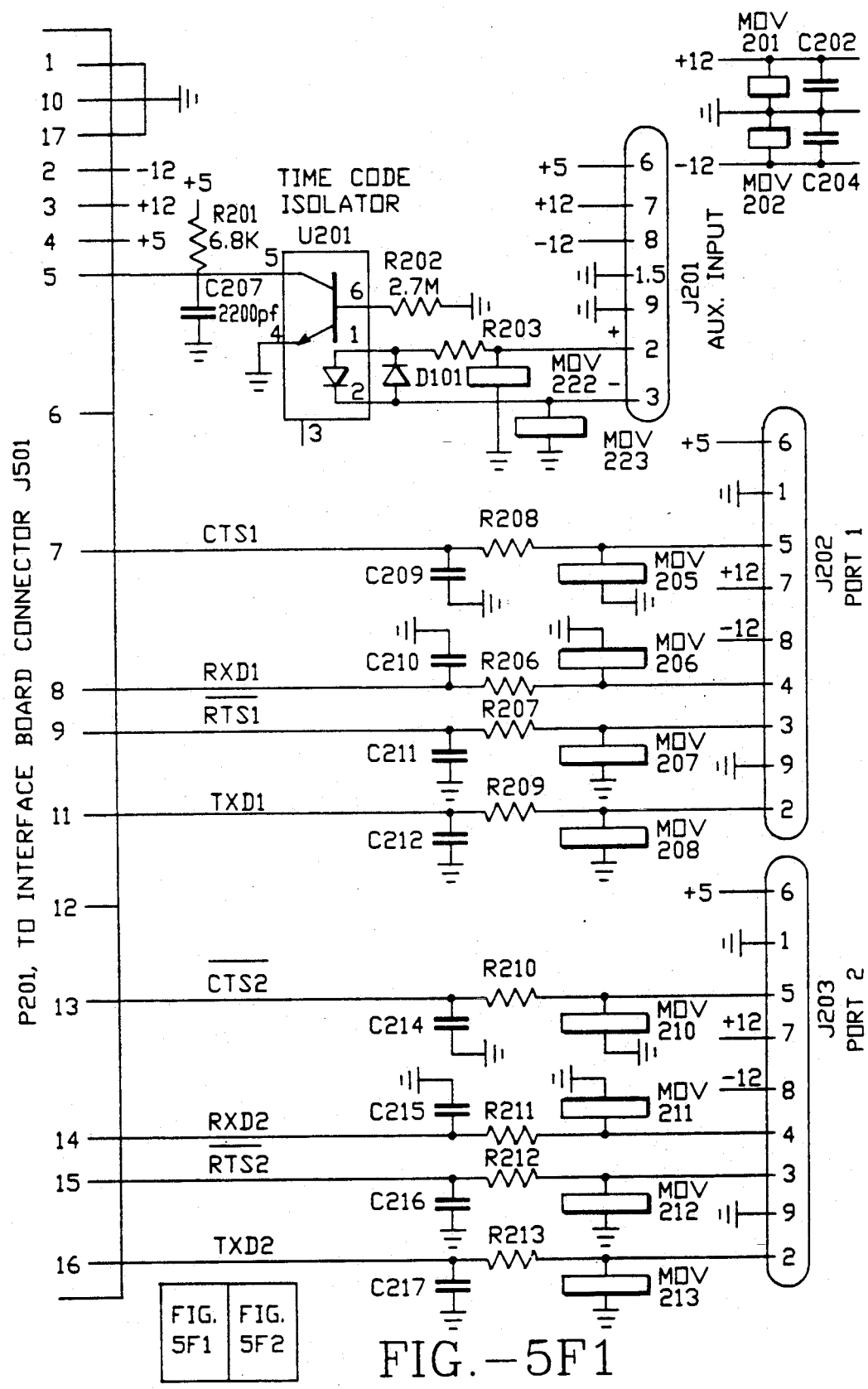
FIG.—5F1

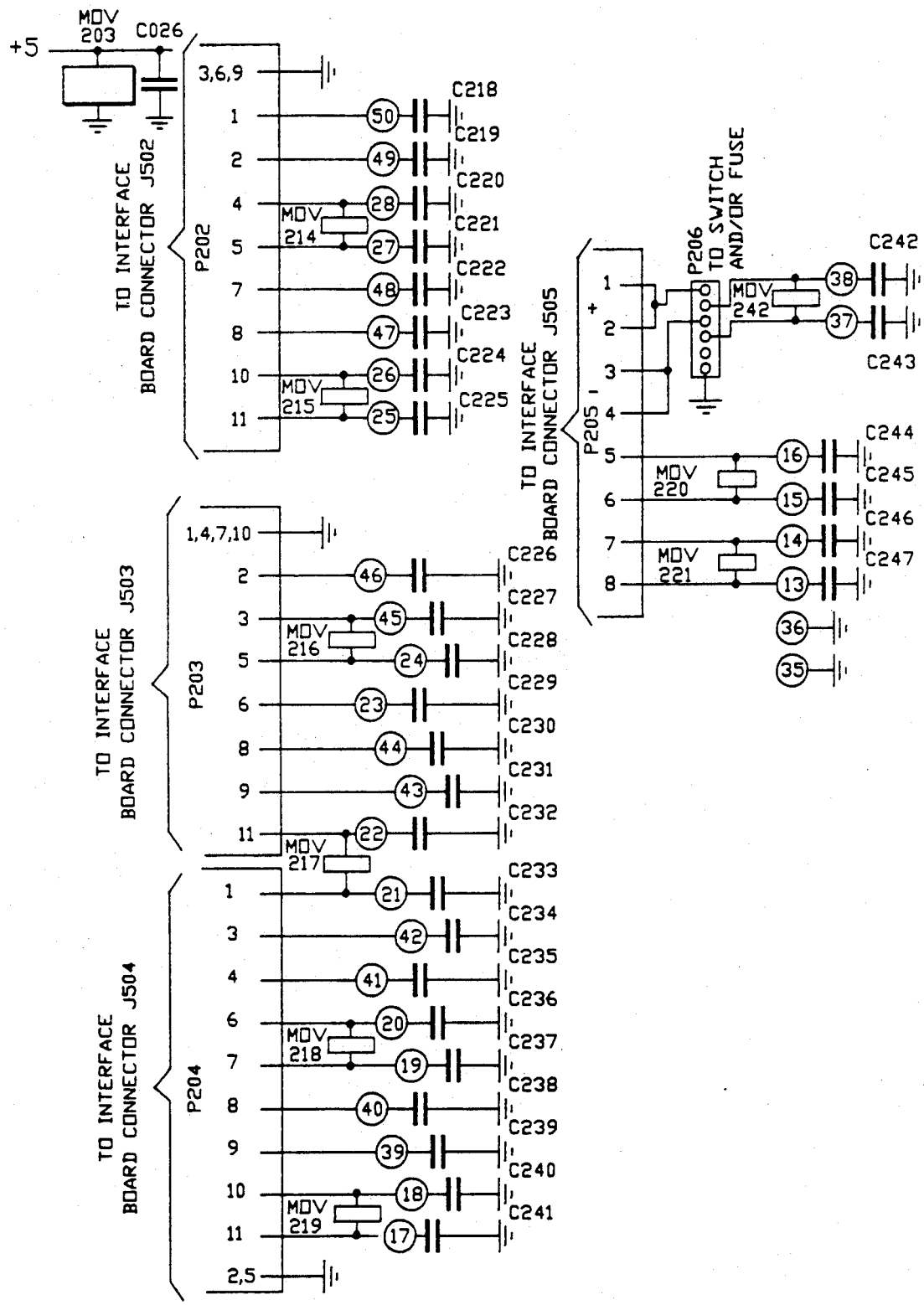
FIG.—5F2

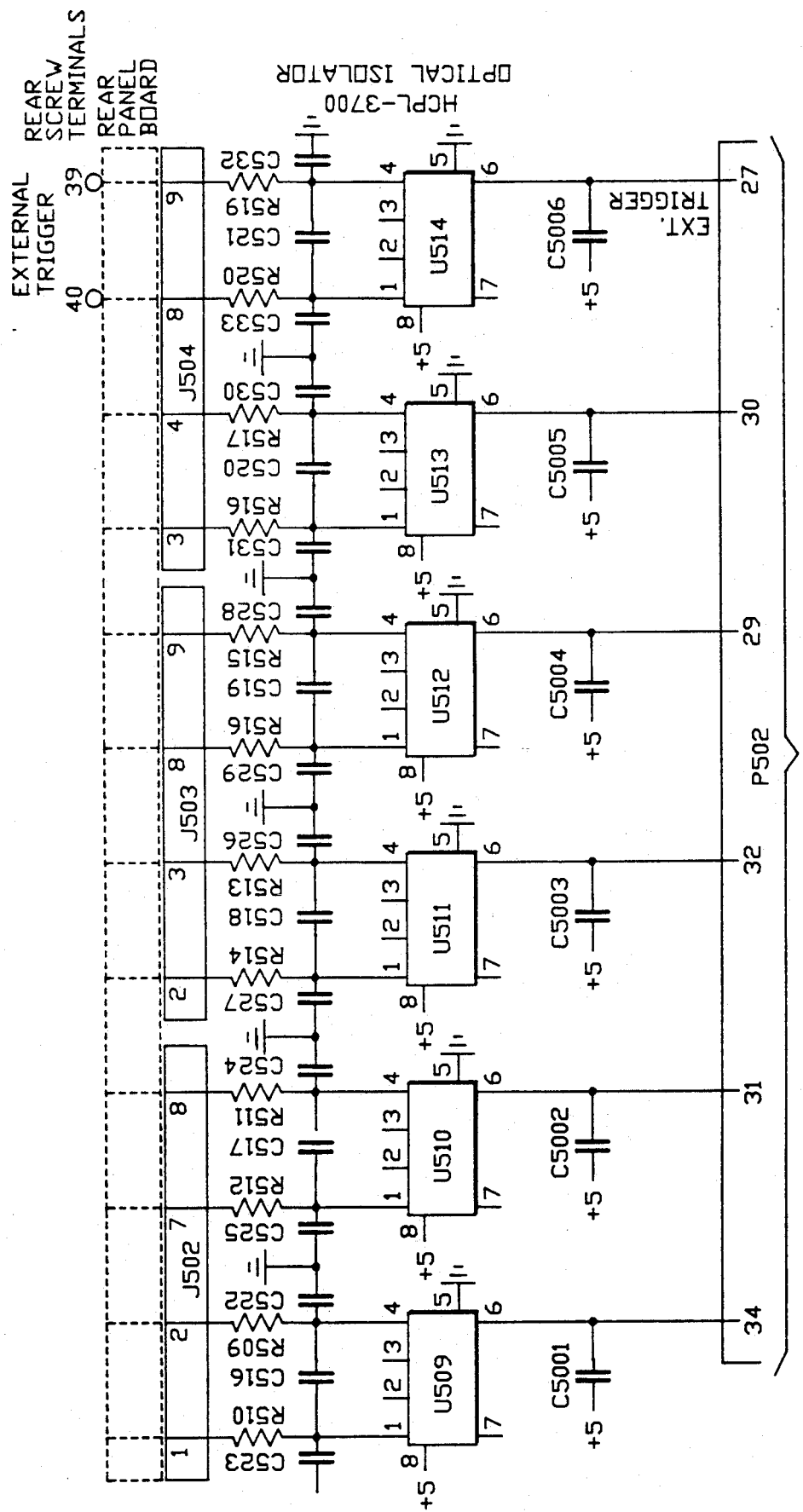
FIG.—5G

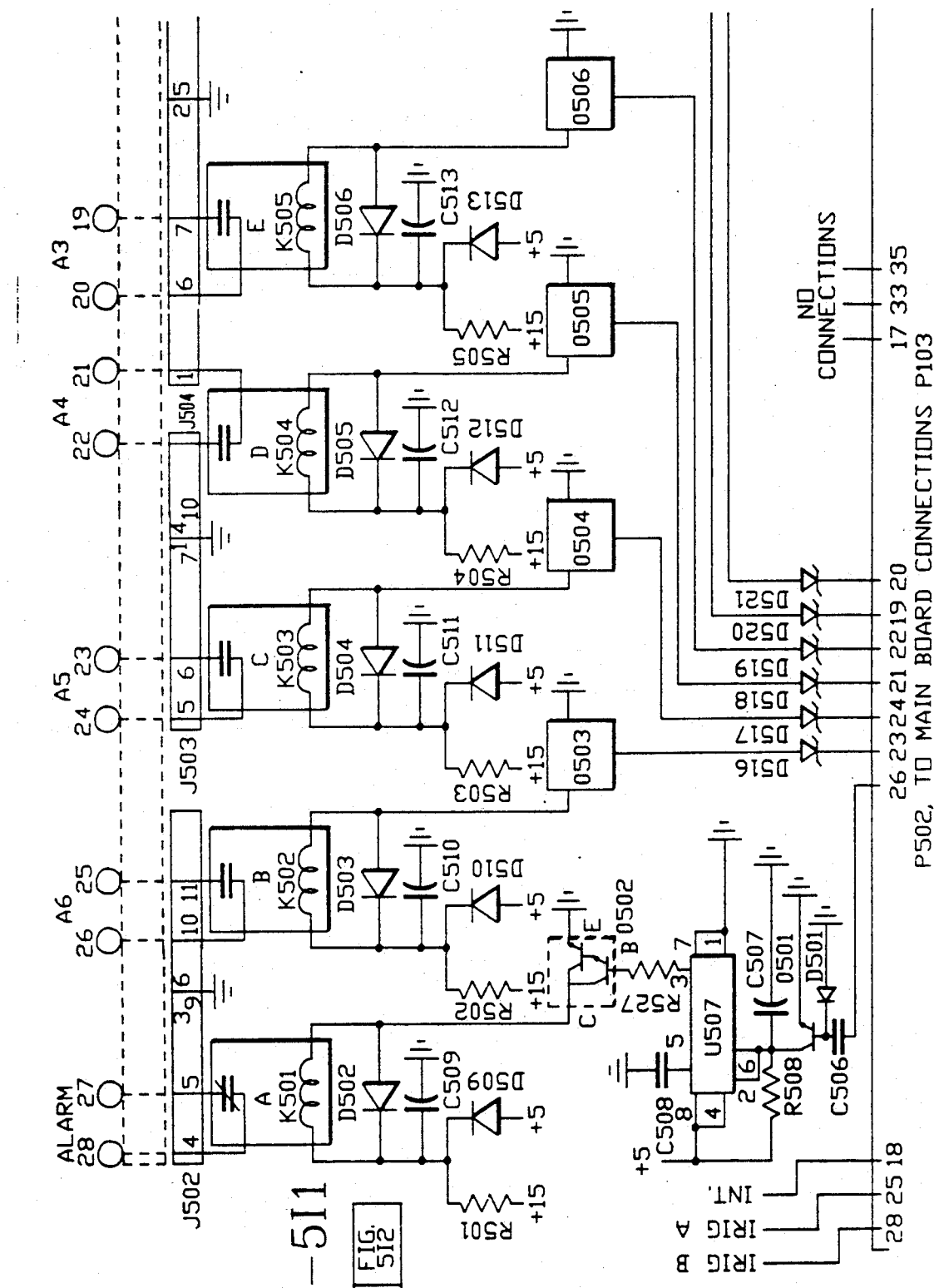

RELAY FOR DETECTING A CURRENT DISTURBANCE AND ASSERTING AN OUTPUT

FIELD OF THE INVENTION

The present invention relates to a rate-of-change relay, and more particularly to a current rate-of-change relay for detecting system disturbances for qualifying system-separation transfer-trip commands.

BACKGROUND OF THE INVENTION

In electrical power systems, fault, status and meter data are used to verify proper operation of the power system, control the system and detect transmission lines faults. The system parameters typically measured are: phase voltages (VA, VB and VC), phase currents (IA, IB, and IC), line power levels (PA, PB and PC) and reactive power level (QA, QB and QC). Manual and automatic systems monitor these quantities to control the power system.

Often, one power system in one geographic location may be tied to a second power system at a remote location. Generally, one system is located in an area of high-power generation while the other system is located in an area of high-power consumption. For example, the Pacific AC Intertie connects the Bonneville Power Administration (BPA) system in the Northwest to the Pacific Gas and Electric (P.G.&E.) system in Northern California.

On such systems, if a disturbance occurs for which stability cannot be maintained, one system, e.g. the BPA, can signal the second system, e.g. P.G.&E., to separate at a certain point. This may be done by a microwave transfer trip signal with audio tones. In certain cases, the separation signal may be accidently or inadvertently generated, resulting in an unwarranted separation of one system from the other. For example, such inadvertent separation may occur as a result of a maintenance or testing error. Such unwarranted separation is obviously expensive, troublesome, and undesirable. Thus, preferably, a backup system is provided to prevent unwarranted separation.

Accordingly, an object of the present invention is to provide a system for detecting system disturbances and qualifying system-separation transfer-trip commands in order to prevent unwarranted separation of one power system from another.

SUMMARY OF THE INVENTION

The invention is directed to an apparatus for detecting a power system disturbance. The apparatus includes means for receiving at least one phase current of a power system and means for filtering the current. The rate of change in the current is determined and that rate is compared to a predetermined value. If the rate of change exceeds the predetermined value, an output is asserted to indicate a system disturbance.

The apparatus adds security to an intertie separation scheme. When a current disturbance is detected in the intertie, the apparatus asserts an output contact and holds it to for a predetermined time period. If, during that period, a transfer trip signal is received, the intertie is tripped.

BRIEF DESCRIPTION OF THE DRAWINGS

Additional objects and features of the invention will be more readily apparent following detailed description and claims when taken in conjunction with the drawings in which:

FIG. 1 is a schematic representation of an intertie between two power systems.

FIG. 1A is a schematic representation of the monitoring system at a first power system.

FIG. 1B is a schematic representation of the apparatus of the present invention located at a second power system.

FIGS. 3 and 4 are views of the front display panel and rear input panel, respectively, of the apparatus of the present invention.

FIGS. 5A-5I are electrical schematic diagrams illustrating the circuitry of the apparatus of the present invention.

DESCRIPTION OF THE PREFERRED EMBODIMENT

Figure 2:
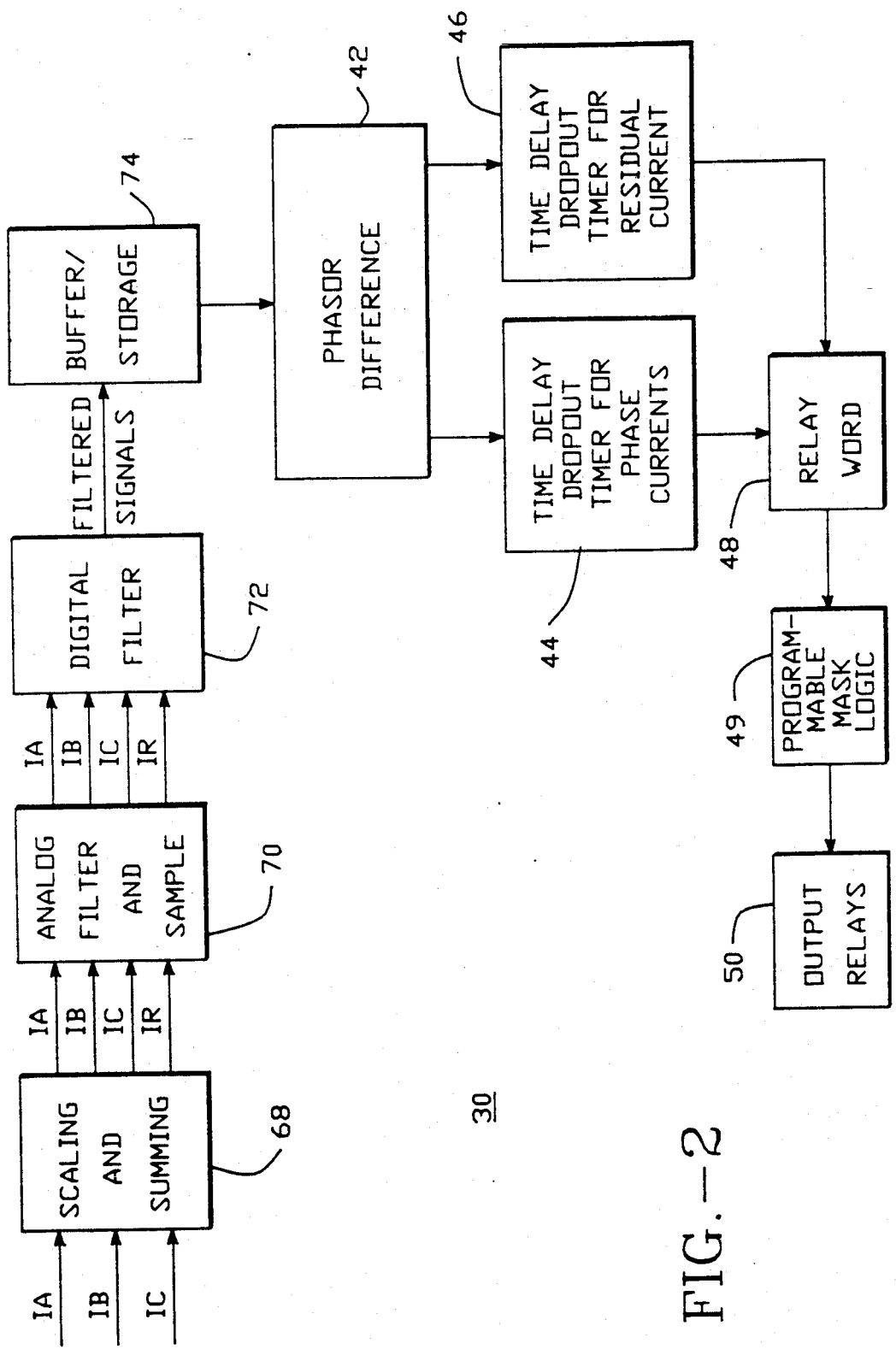
FIG. 2 is a block diagram representation of the apparatus of the present invention.

Reference is initially made to FIG. 1, which shows a first power system 50 connected to a second power system 52 by means of an intertie 54. As discussed, an example of such a distribution system is the Pacific AC intertie between the Bonneville Power Administration (BPA) and Pacific Gas and Electric. (P.G.&E.) power systems.

As shown in FIGS. 1 and 1A, a monitoring system, represented generally by reference numeral 56, is provided at power system 50 for detecting system disturbances for which stability cannot be maintained, e.g. a loss of generation or transmission. In its simplest form, monitoring system 56 consists of a contact 58 which closes on the detection of a system disturbance causing a microwave transfer trip signal to be generated by transmitter key 60. The separation signal is sent via transfer trip channel 62, and indicates to power system 52 that it should separate from power system 50.

As shown in FIGS. 1 and 1B, the signal will cause a contact 64 at power system 52 to close, opening circuit breaker (CB) 66, thereby separating power system 52 from power system 50. The apparatus of the present invention, represented generally by reference number 30, is connected between contact 64 and the trip coil of circuit breaker 66. The apparatus is a current rate-of-change relay which provides additional security for the intertie separation scheme.

Specifically, relay 30 qualifies the separation signal by quantities measured locally at power system 52. It does this by looking for current disturbances. When a current disturbance is detected, relay 30 asserts an output contact 32, and holds it for set period of time. If during that period, the transfer trip signal or separation signal from power system 50 is received, the intertie 54 is tripped. Otherwise, it is not. On the other hand, the intertie is not tripped if a separation signal is received and the contact 32 is not asserted, since in all likelihood, an inadvertent or accidental transfer trip signal was generated.

FIG. 2 is a block diagram representation of the functional aspects of the current rate-of-change relay 30 of the present invention. As shown, relay 30 is connected to power system 52 to receive the phase currents IA, IB and IC. These currents are scaled and summed as represented by block 68. Particularly, the current inputs are scaled to allow up to 11 amps of secondary current full scale. Such sensitive scaling provides good resolution at levels as low as 0.025 amps. The residual current (IR) is formed inside relay 30, from the sum of the phase currents, i.e., $IR = IA + IB + IC$. Alternatively, the residual current may be independently received by relay 30.

The phase current inputs IA, IB and IC are filtered by a two pole lowpass filter 70 with a 85-Hertz (HZ) cutoff frequency. The phase currents are also sampled and then digitally filtered by a double-differentiator smoother digital filter 72. The filtered signals are stored in a buffer 74.

Every quarter cycle, the phasor difference between the present value of the current and its phasor value two cycles earlier is determined. This determination is made for each phase (A, B and C) as well as for the residual current. This operation is represented by block 42. Each of the three phase current difference magnitudes are tested against a predetermined and settable threshold. The residual current difference magnitude is tested against another threshold. If any one of the three difference magnitude exceeds the threshold, or if the current input exceeds some preset or predetermined value, e.g. 10 amps, then a time-delay dropout timer 44 is picked up. The output of the timer stays picked up till the time period equal to its setting passes, e.g. one second, during which the current difference magnitudes have remained below the threshold. The output of timer 44 is recorded in a 8 bit relay word 48 for purposes of controlling output relays 50. The relay word is implemented in a program in microprocessor 88 (see FIG. 5E). It uses programmable logic 49 to control the output relays.

Similarly, if the residual current difference magnitude exceeds its threshold value, or the residual current input exceeds a predetermined value, e.g. 10 amps, another time delay output timer 46 is picked up, and stays asserted until the magnitude remains below its threshold for the timer setting, e.g., one second. This timer output is also available in relay word 48 for controlling output relays 50.

If a transfer trip signal is received during the time in which either timer, thus output contact 32, is asserted, the intertie 54 is tripped. As noted, if the trip signal is received and the timer is not asserted, the intertie is not tripped.

Figure 3:
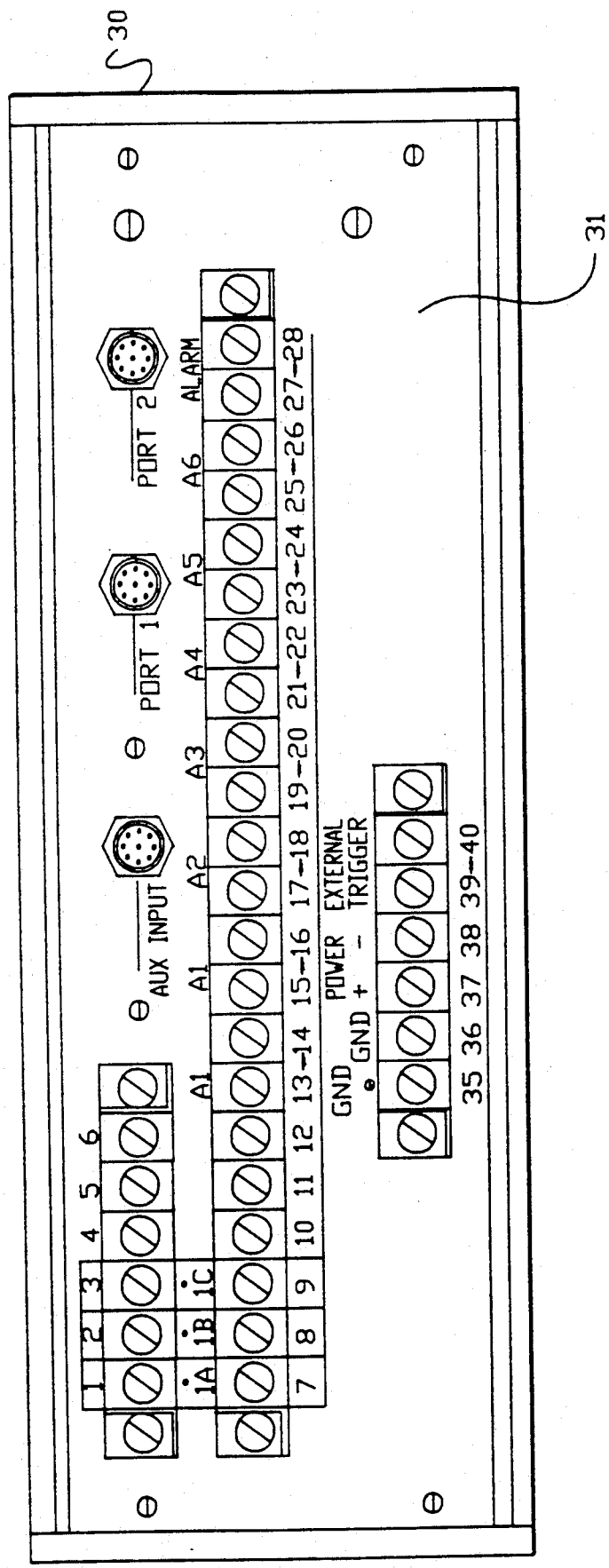

As shown in FIG. 3, all connections to relay 30 may be made at its rear panel 31. The connectors labelled Port 1 and Port 2 may provide RS-232-C serial-data interfaces (9-pin connectors). Port 1 may be used for remote communications via a modem, and port 2 may be used for local communications via a terminal, cathode ray tube (CRT) or other device.

The programmable relay outputs A1, A2, A3, A4, A5, and A6 may be assigned to any combination of the bits in the relay word 48. An ALARM output is also provided. It closes for the following conditions: (1) three unsuccessful level access attempts (discussed below): 1 second pulse; (2) any level 2 access attempt (also discussed below): 1 second pulse; or (3) self test failures: permanent contact closure or 1 second pulse depending on which self test fails.

The output states of relay 30 depend on the following: the relay elements, the setting parameters, the logic programming, and the status of the self-tests. The relay logic may be explained in conjunction with Table 1 which lists the relay elements, timers, contact input, contact outputs, and logic equations.

TABLE 1

| Relay Elements | |
| --- | --- |
| DIA | Excessive rate of change of IA |

TABLE 1-continued

| | |
| --- | --- |
| DIB | Excessive rate of change of IB |
| DIC | Excessive rate of change of IC |
| DIR | Excessive rate of change of IR |
| Timers | |
| DIPS | Stretch timer (institute pickup/time-delayed dropout) for phase current |
| DIRS | Stretch timer (institute pickup/time-delayed dropout) for residual current |
| Contact Input | |
| EXT | External Trigger for event report |
| Contact Outputs | |
| A1 | Programmable Output 1 |
| A2 | Programmable Output 2 |
| A3 | Programmable Output 3 |
| A4 | Programmable Output 4 |
| A5 | Programmable Output 5 |
| A6 | Programmable Output 6 |
| ALARM | System Alarm |
| Logic Equations | |
| DIP = DIA + DIB + DIC | Excessive current change in any phase |
| DIPS = DIP, stretched by DIPS time (institute pickup/time-delayed dropout) | |
| DIRS = DIR, stretched by DIPS time (institute pickup/time-delayed dropout) | |

As discussed, relay element and logic results are represented in an eight-bit relay word 48 (see FIG. 2). The relay word is R=(DIA DIB DIC DIP DIR DIPS DIRS ALRM). The user may select bits in this word to perform the desired functions for tripping or controlling the programmable relay outputs. The selected bits are stored in 8 bit logic masks, where a one in the mask selects a bit from the relay word and a zero deselects for each function. The user programs the bits in these masks with the LOGIC command.

The programmable relay output A1-A6 are controlled by the bits in relay word 48, selected with the corresponding logic masks MA1-MA6, which may be designated as shown in Table 2. For example, to make relay output A1 follow the DIPS and DIRS conditions in the relay word, the above-noted LOGIC command is used to set the sixth and seventh bits in the MA1 mask.

TABLE 2

| |
| --- |
| A1 = R * MA1 |
| A2 = R * MA2 |
| A3 = R * MA3 |
| A4 = R * MA4 |
| A5 = R * MA5 |
| A6 = R * MA6 |

The target light emitting diodes (LEDs) 75-82 on the front panel 54 of relay 30, as shown in FIG. 4, display the relay word, except that the enable LED 75 follows the inverse of the ALRM bit. The targets do not latch. The target test button 84 may be pressed any time, to test the eight LEDs 75-82.

The relay 30 may run a variety of self tests that ensure reliable operation. Some tests have warning and failure states, while some, such as the analog-to-digital convertor (A/D) test, only have failure states. Any change in self test status may result in the generation of a status report.

Failure of any test causes the ALARM contacts to close and the enable LED 75 to turn off. Failures that disable the control functions also place the output relay driver port in an input mode so that no A-contact outputs A1-A6 may be asserted. All self tests are run on power-up before the relay is enabled, or prior to enabling the relay after using the setting procedure or the above-noted LOGIC command. Afterwards all self tests are run every few minutes. The offset voltage of each channel of the analog input electronics is measured and compared against fixed limits. A warning is issued when the offset is measured to be greater than 50 millivolts in any channel. A failure is declared when the offset exceeds 75 millivolts. All data acquisition/relay functions and control functions remain enabled. The ALARM relay is pulsed closed for one second when this test fails. The power supply voltages are limit-checked.

A STATUS command response is transmitted for any failure or warning. A failure of the +5 volt supply causes all output relays to be de-energized and blocked from operation. A failure of the ±/−15 volt supplies disables protective relay functions, but does not disable control functions. The ALARM relay remains closed.

Relay 30 includes a random-access memory (RAM) and a read-only memory (ROM) implemented by elements U109-U115 (see FIG. 5E). The RAM is periodically checked to ensure that each byte can be written to and read from correctly. There is no warning state for this test. If a problem is detected, a STATUS command message is transmitted. It contains the socket designation of the affected RAM IC. Protective and control functions are disabled for a RAM failure, and the ALARM output relay contacts close.

The ROM is periodically tested by computing a checksum. If the computed value does not agree with the stored value, a ROM failure is declared. The STATUS command response is transmitted, all protection and control functions are disabled, and the ALARM relay contacts close.

The analog-to-digital converter (A/D or ADC) 86 (see FIG. 5D) changes voltage signals derived from the power system currents IA, IB and IC into numbers for processing by the microcomputer. The ADC test determines if the converter is functioning by checking its conversion time. If the conversion time is excessive, or if a conversion is started and never finishes, then the test fails. There is no warning state for this test. Failure of the ADC causes the protective functions to be disabled, but the control functions are retained. The STATUS command response is transmitted, and the ALARM relay contacts close for a failure of this test.

For the master offset (MOF) a zero volt input is selected by the multiplexer 84 (see FIG. 5D). If the offset is greater than 75 mv then the test fails. Failure of the test disables the offset and master offset tests. Data acquisition/relay functions and control functions are retained. The ALARM relay is pulsed closed for one second when this test fails.

Two images of the system setting are stored in nonvolatile memory U115 (see FIG. 5E). These are compared when the relay 30 is initially set, and periodically thereafter. Should the images ever disagree, the setting test fails, and all protection and control functions are disabled. The STATUS message is transmitted to indicate the failed test. Settings for relay 30 are entered using SET and LOGIC commands, via either of the serial interface Ports 1 or 2. The settings are stored in nonvolatile memory, so that they are retained when the power is off.

The relay records an eleven-cycle event report following assertion of the external trigger input, or execution of a TRIGGER command. The twelve most-recent event reports are stored in memory, and may be retrieved using an EVENT command. A short history of the twelve most-recent events is available using a HISTORY command.

As discussed, the relay 30 is set and operated via serial communications interfaces, which connect to a computer terminal and/or modem, or a protective relay terminal unit. Communication serves the following purposes: setting of the relay; transmitting messages in response to changes in system status, e.g., self test warning; generating an event record for assertion of the external trigger input or execution of the trigger command; and responding to commands spanning all functions of the apparatus such as metering, setting the clock and control operations. There are two levels of access (access levels 1 and 2). These access levels are available through the communications Ports 1 and 2, and are protected against unauthorized access via passwords. It is impossible to disable any relaying or control functions via communications, except by entering unintended or improper settings, using SET or LOGIC commands. Other commands are discussed below.

The optical command parameter N selects the number of times the meter data are displayed. For example, to see a series of eight meter readings, type METER 8<CR>. The currents are displayed in secondary amperes. An example is shown below in Table 3.

TABLE 3

| Current Disturbance Detector | Date: 1/1/89 | | Time: 01:01:44 | |
|---|---|---|---|---|
| | A | B | C | R |
| I (A) | 5.000 | 5.000 | 5.000 | 0.000 |

The Targets [N] [K] command selects the information to be displayed on the front-panel target LEDs, and also communicates the state of the selected LEDs. When the relay power is turned on, the LED display indicates the functions marked on the front panel. That is, the LEDs default to displaying the information shown in the row labeled RELAY TARGETS in Table 4 below. Using the TARGET command, you may select either of two sets of data, as listed below, to be printed and to be displayed on the LEDs.

TABLE 4

| LED: | 1 | 2 | 3 | 4 | 5 | 6 | 7 | 8 |
|---|---|---|---|---|---|---|---|---|
| N 0 | EN | DIA | DIB | DIC | DIP | DIR | DIPS | DIRS RELAY TARGETS |
| 1 | A1 | A2 | A3 | A4 | A5 | A6 | ALRM | ET CONTACT 1/0 |

N=0 corresponds to the normal display. N=1 gives the status of the seven output contacts and the one logic input. These selections are useful in testing, in checking contact states, and in remotely reading the targets. A "1" indicates an asserted element; a "0" indicates an unasserted element.

The optional command parameter K selects the number of times the target data are repeatedly displayed for a certain choice of parameter N. For example, to see a series of ten target readings of target number one, type TARGET 1 10. The function of the targets may be returned to display the fault targets by typing TAR 0. The relay target status is automatically returned to TAR 0 when the relay is returned to the Level 0 access. This is accomplished by typing QUIT. Pressing the TARGET TEST button on the front panel lights up all target LEDs for about one second, as a lamp test.

Enter TRIGGER <CR> to generate an event record. A response of "Triggered" is transmitted. After a short delay, during which the computer is formatting the just-triggered record, a summary of the record is sent to the serial port(s) designated by the auto port setting for display or printout. The TRIGGER command is useful for inspecting the phasor currents at any time. Event records may also be generated without control action by asserting the EXTERNAL TRIGGER input.

The logic command Logic N programs a series of masks used for controlling the output of the relay. The parameter N specifies which mask to program. The N can be any of the following:

MA1—Mask for A1 relay control
MA2—Mask for A2 relay control
MA3—Mask for A3 relay control
MA4—Mask for A4 relay control
MA5—Mask for A5 relay control
MA6—Mask for A6 relay control The logic programming procedure consists of typing in changes for the mask, or by typing <CR>, indicating no change. Each of the masks, listed above, has one line of eight data bits, corresponding to the relay word as follows: DIA DIB DIC DIP DIR DIPS DIRS ALRM.

Once all data are provided for, the relay word and the new logic settings are displayed, and a prompt is issued requesting approval to enable the relay with the new logic settings. Answering "Y" enters the new data, clears the event buffers, pulses the ALARM contact closed and turns off the ENABLE target LED momentarily. Answering "N" retains the old settings.

The logic command, when executed, displays a header for the relay word (as shown above) and the present logic mask for the relay word. Then, a question mark prompt displays, and the relay waits for input. Enter only ones and zeros as input, where one selects and zero deselects a member of the relay word. Press the carriage return if the group is satisfactory. If it is desired to change any member of a group, then all eight members of a relay word must be input at the same time, even if no change is desired for some members. If an error occurs during input of new data, the existing settings and question mark prompt are redisplayed, so a correction can be entered. The programmable masks enable the outputs to be used for any desired function.

The setting procedure consists of answering prompting messages with new data, or by typing <CR>, indicating no change. Once all data are provided, the new settings are displayed, and a prompt is issued requesting approval to enable the relay with the new settings. Once all desired setting changes are entered, it is not necessary to scroll through the remaining settings. Type "END" after the last setting change to skip to the new settings display and the enable prompt. However, the "END" statement should not be used for the relay ID setting. Use CTRL-X to abort the set procedure instead.

Error messages indicate when the entered data result in out-of-range settings. If no error messages are received, then the new settings are enabled, the event buffers are cleared, and the ALARM contact closes momentarily.

The following data are required to set relay 30:
RelayID. Identifier string, up to 39 characters long
DIP: Phase current change threshold, in secondary amps (0.025–5A)
DIR: Residual current change threshold, in secondary amps (0.025–5A)
DIPS: Time delay dropout setting for phase current changes (0–8000 cycles)
DIRS: Time delay dropout setting for residual current changes (0–8000 cycles)
TIME1: Timeout for Port 1 (0–30 minutes)
TIME2: Timeout for Port 2 (0–30 minutes)
AUTO: Autoport (Port 1 or 2, or 3 for both Ports 1 and 2)
RINGS: The number of rings after which the modem answers (1–30 rings)

As the settings are entered, they are checked against the setting limits given above. Then the relay computes internal settings from the entries to be used by the relay algorithms. The AUTO setting selects Port 1 or 2, or both of the two serial ports for automatically transmitted messages. Table 5 below shows the effect of each possible setting:

TABLE 5

| AUTO SETTING | AUTOMATIC MESSAGE DESTINATION PORT |
| --- | --- |
| 1 | 1 |
| 2 | 2 |
| 3 | 1 and 2 |

The relay transmits a summary event report when it is triggered by either the EXTERNAL TRIGGER (ET) input or by the TRIGGER command. It also saves a full eleven-cycle event report in its memory. The summary report includes the identifier message entered at the beginning of the setting procedure, date, and time. The relay saves the twelve most-recent event reports.

The summary report is automatically transmitted out the designated AUTOMATIC port or ports (refer to AUTO setting), regardless of access level, as long as that port has not timed out. If the automatic transmissions are to be monitored by a dedicated channel or to be printed on a dedicated printer, be sure to enter a setting of zero for the port timeout interval of the appropriate port (refer to TIME1, TIME2 settings).

The full report contains current information from which phasor diagrams may be constructed. It also contains status points for the relay elements, input and outputs. The full report is not automatically transmitted, owing to its length (about one page). Its transmission is requested by using the EVENT command, e.g., EVENT 1.

The most-recent twelve events are stored in the relay volatile memory. These data are retained as long as the control power remains on. This differs from the relay settings, which are retained in nonvolatile memory. The settings are retained until changed by the SET command, regardless of control power cycling. The stored events may be reviewed using the HISTORY command.

A sample event report is provided in Appendix I. This report was generated in response to a simulated disturbance by connecting an output relay to assert the EXTERNAL TRIGGER input.

The analog data provided in the event report are determined from the secondary quantities presented at the rear panel of relay 30, by the following processing steps (see also FIG. 2). The input analog signals are filtered by two-pole low-pass filters with cutoff frequencies of about 85 Hz. The filtered analog signals are sampled four times per power system cycle, and converted into numerical values. The sampled data are processed by digital filters which remove dc and ramp components. The unit sample response of these filters is: 1, −1, −1, 1. This filter has the property of a double differentiator-smoother. Since the samples are taken four times per power-system cycle, and since the four most-recent samples are processed through the digital filter every quarter cycle, successive outputs of the filter arrive every 90 degrees. That is, with respect to the present value of the filter output, the previous value was taken one-quarter cycle earlier, and appears to be leading the present value by 90 degrees.

These filter output values can be used to represent the signals as phasors. Thus, the present value of the output is the X-component of the phasor, and the previous value of the output is the Y-component of the phasor.

It may seem confusing to refer to the older data as the leading component of the phasor. The following example may help. Consider a sinewave with zero phase shift with respect to $t=0$, and having a peak amplitude of 1. Now consider two samples, one taken at $t=0$, and the other taken 90 degrees later. They have values 0 and 1, respectively. By the above rules, the phasor components are $(X,Y)=(1,0)$. Now consider a cosine function. Its samples taken at the same time instants are 1 and 0, and its phasor representation is (0,1). The phasor (0,1) leads the phasor (1,0) by 90 degrees, and this agrees with the 90-degree lead that the cosine function has with respect to the sine function.

To construct a phasor diagram, select a pair of adjacent rows in the event report (see Appendix I), in the region of interest. On Cartesian coordinates, plot the lower row (more-recent data) as the X-components, and the upper row (older data) as the Y-components. The complete phasor diagram may be rotated to any preferred angle of reference. The effective value of any of the phasors equals the square root of the sum of the squares of the components. Note that moving forward one quarter-cycle causes all of the phasors to rotate 90 degrees, as can be seen by plotting the phasor diagram using, say rows 1 and 2, then rows 2 and 3.

Referring to the event report of Appendix I, the states of all relay elements are indicated in the columns headed "Relays". Active states of the various relay elements are indicated by asterisks. Inactive states are indicated by periods placed in the corresponding columns. The contents of the columns for active relay elements correspond to the bits in the relay word, with the exception of the ALARM output, which is included under the "Outputs" column.

The states of all output and input contacts are shown in the next two groups of columns, headed "Outputs" and "Input". Assertion of any output or input contact is indicated by an asterisk in the corresponding column, while nonassertion is indicated by a period. The contents of the columns are:

---

OUTPUTS
A1: PROGRAMMABLE output#1
A2: PROGRAMMABLE output#2
A3: PROGRAMMABLE output#3
A4: PROGRAMMABLE output#4
A5: PROGRAMMABLE output#5
A6: PROGRAMMABLE output#6
AL: ALARM output
INPUT
ET: EXTERNAL TRIGGER
(for event report) input

---

Figure 5A:
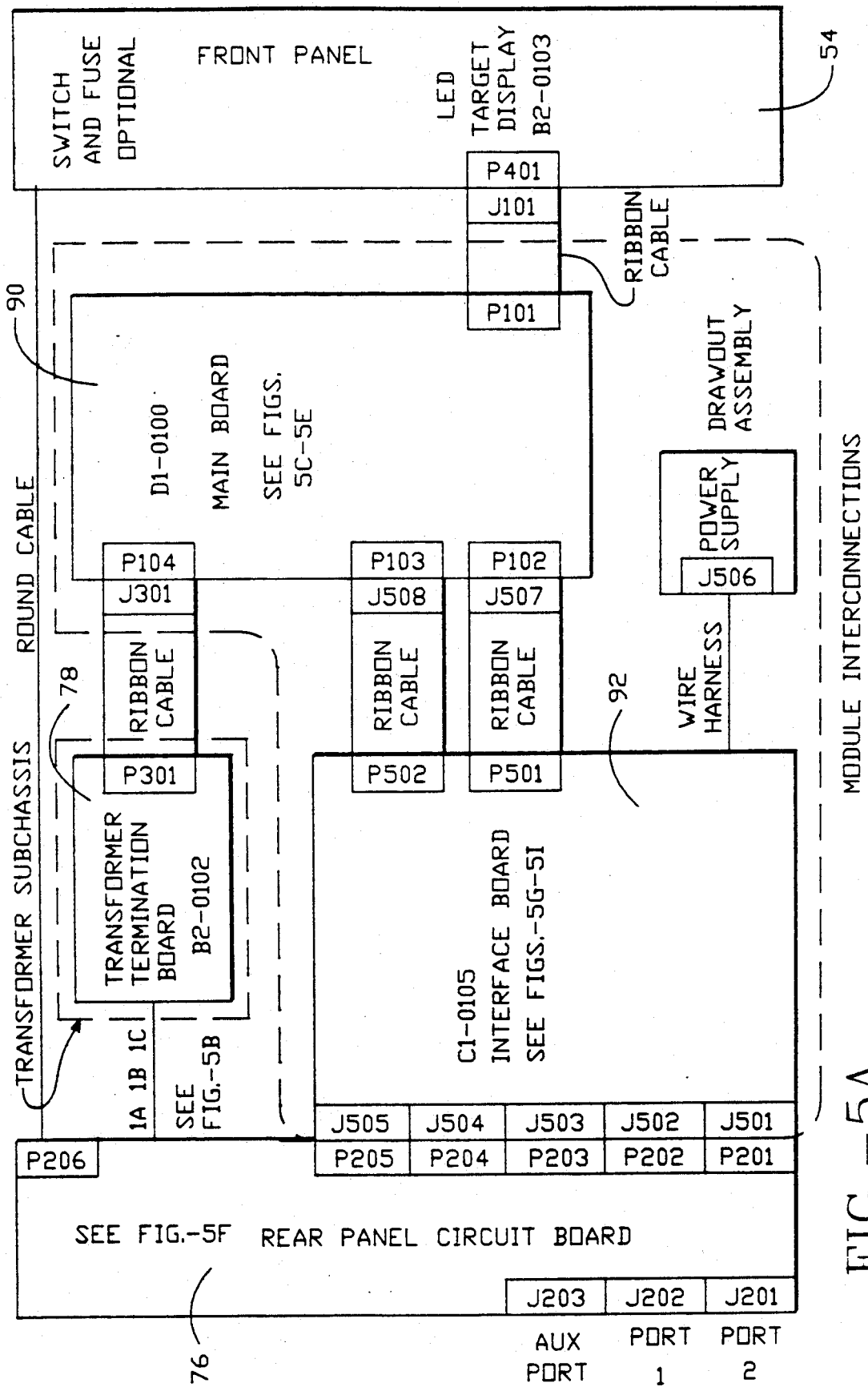

An electrical schematic diagram of the circuitry that may be utilized in relay 30 is illustrated in FIGS. 5A–5I. FIG. 5A illustrates the module interconnections among the various boards and components that comprise the circuitry. As discussed, the LED displays are on front panel 54. The communication ports (Ports 1 and 2 and the Auxiliary Port), the relay outputs A1–A6, ALARM output, and the analog inputs are at rear panel 56, and connected with the relay circuitry by rear panel circuit board 76.

The phase currents IA, IB and IC are scaled down, as discussed, by means of the transformers on transformer termination board 78, as shown in FIGS. 5A and 5B. The other analog input channels shown on FIG. 5B are not used.

As shown on FIG. 5C, the phase currents are summed by op amp U1116 and associated resistors R112–R115 on main board 90 to form the residual current. Alternatively, as discussed, the residual current may be received independently. The phase currents and the residual current are then filtered by the lowpass filter, represented generally by reference numeral 80. Thereafter, the currents are sampled and held by sample/hold device 82.

The phase and residual currents are then fed through multiplexer 84 and converted to digital format by A/D converter 86. These components are also located on main board 90. See FIG. 5D.

As shown in FIG. 5E, the circuitry on main board 90 further includes a microprocessor 88, such as a Motorola MC6809, which controls the operation of the relay. The circuitry also includes ROMS, RAMS and EPROMS U109–U115 for carrying out the various digital signal processing functions discussed above. The relay word, phasor difference and timer functions are programmed in microprocessor 88.

Figure 5H:
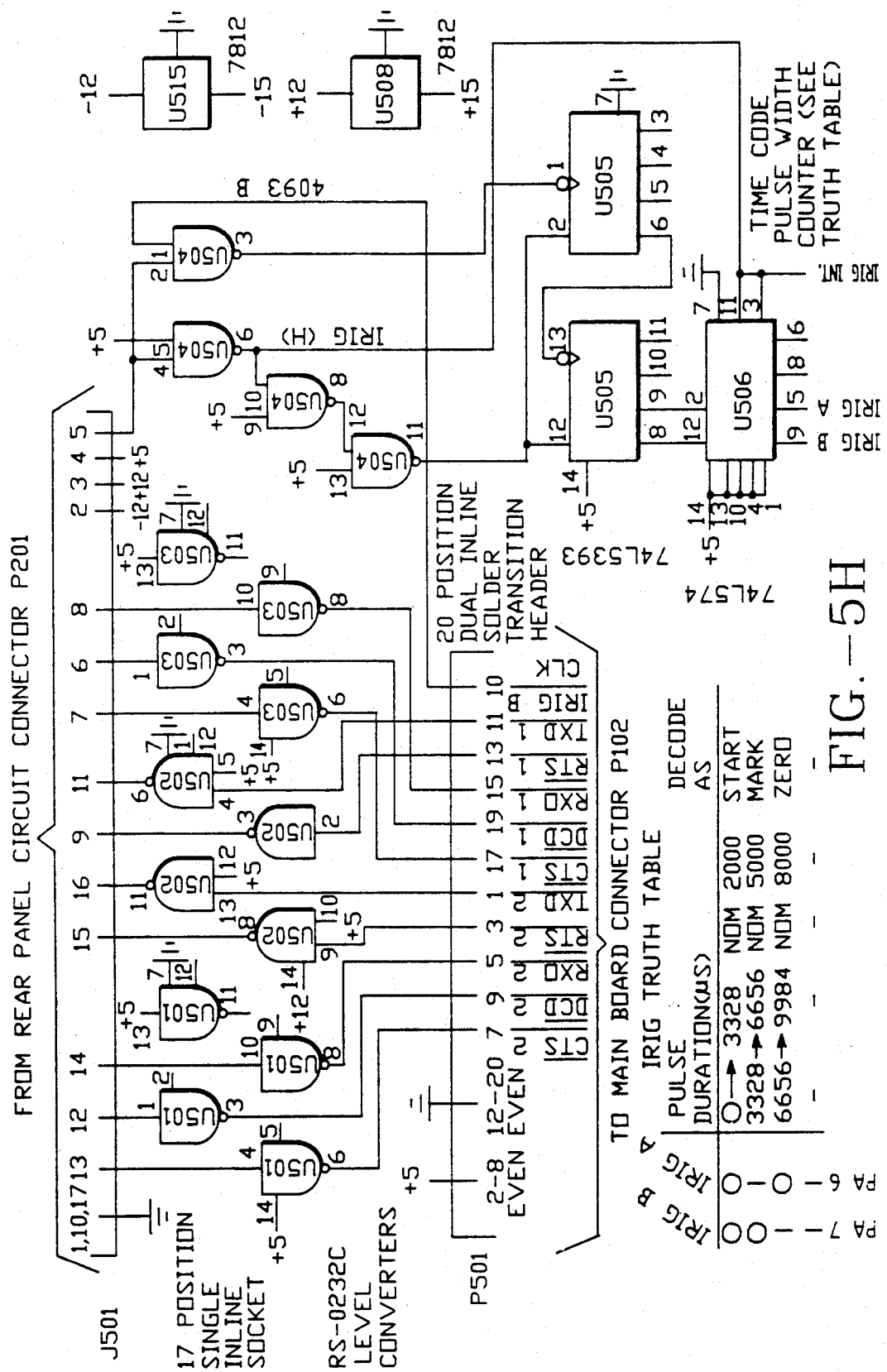
Figure 512:
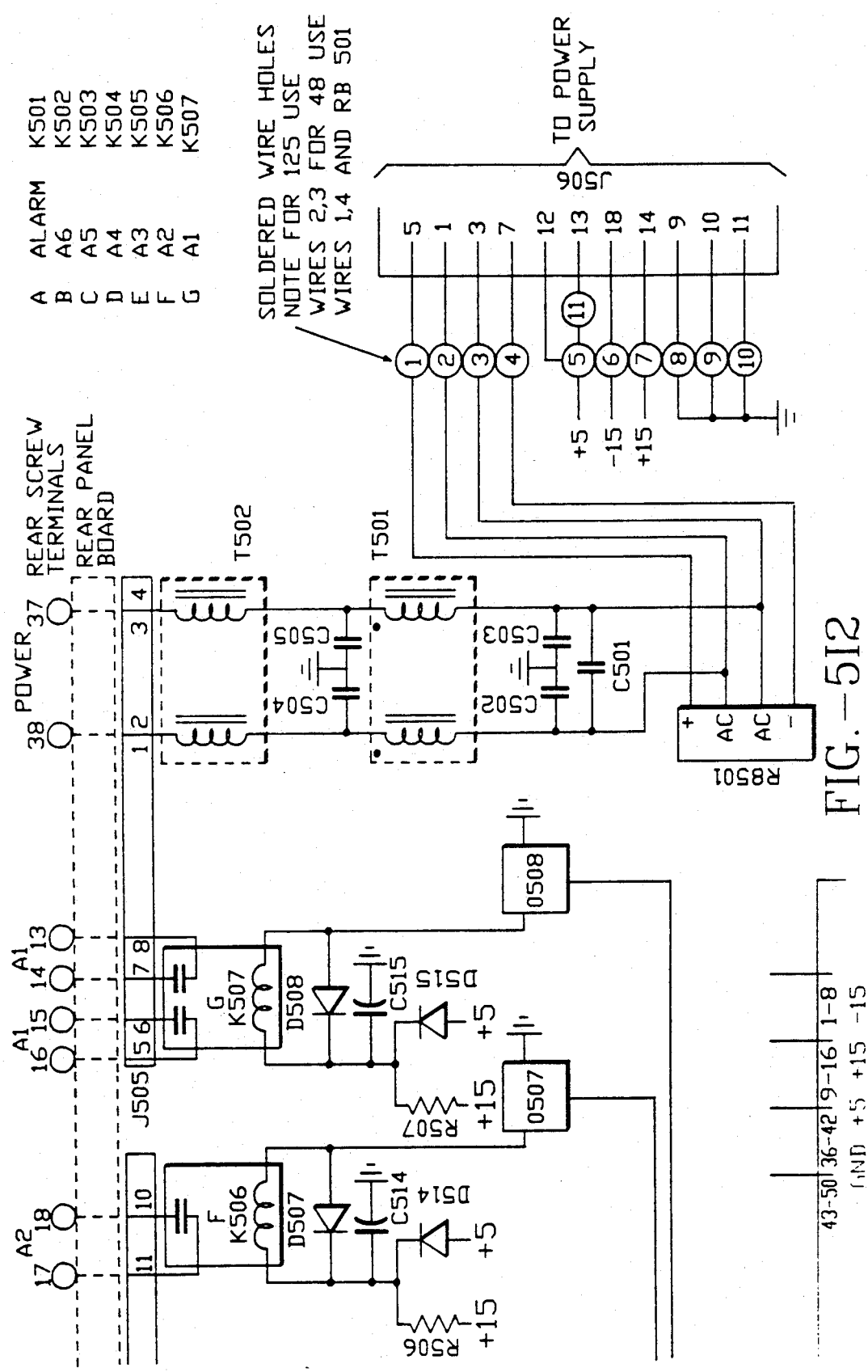

FIG. 5F illustrates the connections from the terminals and ports of rear panel 52 (see FIG. 3) to rear panel circuit board 76 (see FIG. 5A). FIGS. 5G–5I show the connections between interface board 92 and main board 90 as well as from interface board 92 to power supply 94.

Although certain embodiments of the invention have been described herein in detail, the invention is not to be limited only to such embodiments, but rather only by the appended claims.

---

SAMPLE EVENT REPORT

Current Disturbance Detector  Date: 1/9/89  Time: 13:56:55.616
FID=SEL-150-R100-V65p-D890106
Currents  Relays  Outputs  Input
(amps)

-continued

| IR | IA | IB | IC | DIA | DIB | DIC | DIP | DIR | DIPS | DIRS | A1 | A2 | A3 | A4 | A5 | A6 | AL | ET |
|---|---|---|---|---|---|---|---|---|---|---|---|---|---|---|---|---|---|---|
| 0.010 | 0.002 | 0.004 | 0.000 | | | | | | | | | | | | | | | |
| 0.002 | −0.002 | 0.000 | 0.004 | | | | | | | | | | | | | | | |
| −0.010 | −0.002 | −0.004 | 0.000 | | | | | | | | | | | | | | | |
| −0.002 | 0.002 | 0.000 | −0.004 | | | | | | | | | | | | | | | |
| 0.010 | 0.002 | 0.004 | 0.000 | | | | | | | | | | | | | | | |
| 0.002 | −0.002 | 0.000 | 0.004 | | | | | | | | | | | | | | | |
| −0.010 | −0.002 | −0.006 | 0.000 | | | | | | | | | | | | | | | |
| −0.002 | 0.002 | 0.002 | −0.004 | | | | | | | | | | | | | | | |
| 0.010 | 0.002 | 0.006 | 0.000 | | | | | | | | | | | | | | | |
| 0.002 | −0.002 | −0.002 | 0.004 | | | | | | | | | | | | | | | |
| −0.010 | −0.002 | −0.006 | 0.000 | | | | | | | | | | | | | | | |
| −0.039 | −0.037 | 0.002 | −0.004 | | | | | | | | | | | | | | | |
| −0.476 | −0.484 | 0.006 | 0.000 | | | | • | | • | | | | | | • | | • | |
| 0.237 | 0.239 | −0.002 | 0.004 | | | | • | | • | | | | | | • | | • | |
| 1.384 | 1.394 | −0.006 | 0.000 | • | | | • | • | • | • | | | | | • | | • | • |
| −0.404 | −0.408 | 0.002 | −0.004 | • | | | • | • | • | • | | | | | • | | • | • |
| −1.863 | −1.875 | 0.006 | 0.000 | • | | | • | • | • | • | | | | | • | | • | • |
| 0.410 | 0.412 | −0.002 | 0.004 | • | | | • | • | • | • | | | | | • | | • | • |
| 1.931 | 1.942 | −0.006 | 0.000 | • | | | • | • | • | • | | | | | • | | • | • |
| −0.414 | −0.412 | 0.002 | −0.004 | • | | | • | • | • | • | | | | | • | | • | • |
| −1.939 | −1.952 | 0.006 | 0.000 | • | | | • | • | • | • | | | | | • | | • | • |
| 0.416 | 0.414 | −0.002 | 0.004 | • | | | • | • | • | • | | | | | • | | • | • |
| 1.937 | 1.952 | −0.006 | 0.000 | | | | • | • | • | | | | | | • | | • | • |
| −0.412 | −0.414 | 0.002 | −0.004 | | | | • | • | • | | | | | | • | | • | • |
| −1.939 | −1.952 | 0.006 | 0.000 | | | | • | • | • | | | | | | • | | • | |
| 0.412 | 0.414 | −0.002 | 0.004 | | | | • | • | • | | | | | | • | | • | |
| 1.941 | 1.952 | −0.006 | 0.000 | | | | • | • | • | | | | | | • | | • | |
| −0.416 | −0.414 | 0.002 | −0.004 | | | | • | • | • | | | | | | • | | • | |
| −1.939 | −1.952 | 0.006 | 0.000 | | | | • | • | • | | | | | | • | | • | |
| 0.416 | 0.414 | −0.002 | 0.004 | | | | • | • | • | | | | | | • | | • | |
| 1.939 | 1.952 | −0.004 | 0.000 | | | | • | • | • | | | | | | • | | • | |
| −0.416 | −0.414 | 0.000 | −0.004 | | | | • | • | • | | | | | | • | | • | |
| −1.939 | −1.952 | 0.004 | 0.000 | | | | • | • | • | | | | | | • | | • | |
| 0.416 | 0.414 | 0.000 | 0.004 | | | | • | • | • | | | | | | • | | • | |
| 1.939 | 1.952 | −0.006 | 0.000 | | | | • | • | • | | | | | | • | | • | |
| −0.416 | −0.414 | 0.002 | −0.004 | | | | • | • | • | | | | | | • | | • | |
| −1.939 | −1.952 | 0.006 | 0.000 | | | | • | • | • | | | | | | • | | • | |
| 0.416 | 0.414 | −0.002 | 0.004 | | | | • | • | • | | | | | | • | | • | |
| 1.939 | 1.952 | −0.006 | 0.000 | | | | • | • | • | | | | | | • | | • | |
| −0.416 | −0.414 | 0.002 | −0.004 | | | | • | • | • | | | | | | • | | • | |
| −1.939 | −1.952 | 0.006 | 0.000 | | | | • | • | • | | | | | | • | | • | |
| 0.416 | 0.414 | −0.002 | 0.004 | | | | • | • | • | | | | | | • | | • | |
| 1.939 | 1.952 | −0.006 | 0.000 | | | | • | • | • | | | | | | • | | • | |
| −0.416 | −0.416 | 0.004 | −0.004 | | | | • | • | • | | | | | | • | | • | |

DIP = 1.00           DIR = 0.10           DIPS = 60.00         DIRS = 60.00
TIME1 = 5            TIME2 = 0            AUTO = 2             RINGS = 3
Logic settings:
MA1  MA2  MA3  MA4  MA5  MA6
80   40   20   08   D4   02

What is claimed:

1. An apparatus for detecting a power system disturbance, comprising:
   means for receiving at least one phase current or a residual current of a power system;
   means for scaling down said current;
   means for filtering and sampling said current;
   means for converting said current to digital data, and digital filter means for removing selected components from said digital data;
   means for determining the rate of change of said current, said determining means including means for determining a phasor difference between the present value of said current and a value of said current at a predetermined earlier time;
   means for comparing said rate of change to a predetermined value; and
   means for asserting an output if said predetermined value is exceeded.

2. The apparatus of claim 1 wherein said filtering means includes an analog filter.

3. The apparatus of claim 2 wherein said analog filter is a two-pole lowpass filter having a cutoff frequency of about 85 HZ.

4. The apparatus of claim 2 wherein said digital filter means removes DC and ramp components.

5. The apparatus of claim 2 wherein said digital filter means is a double differentiator-smoother filter.

6. The apparatus of claim 1 wherein said current is sampled four times per system cycle.

7. The apparatus of claim 1 wherein said comparing means includes means for comparing said phasor difference to a predetermined threshold setting such that a time-delay dropout timer means is asserted if said phasor difference exceeds said threshold setting or a predetermined value of said current and remains asserted until said phasor difference stays below said threshold setting or said predetermined value for a period of time equal to the setting of a timer means.

8. The apparatus of claim 7 further including means for separating one power system from another if a separation signal is received during the time said timer means is asserted.

9. The apparatus of claim wherein said receiving means receives all three phase currents.

10. The apparatus of claim 9 further including means for summing said phase currents to determine said residual current.

11. The apparatus of claim 1 which uses programmable-mask logic for detection a power system disturbance.

12. The apparatus of claim 1 further including means for separating a first power system from a second power system if a system separation signal is received during the time said output is asserted.

13. A method for detecting a power system disturbance, comprising:
   receiving at least one phase current or a residual current of a power system;
   scaling down said current;
   filtering and sampling said current;
   converting said current to digital data;
   removing DC and ramp components from said digital data;
   determining a phasor difference between the present value of said current and a value of said current at a predetermined earlier time;
   comparing said phasor difference to a predetermined threshold setting and asserting a time-delay dropout timer means if said phasor difference exceeds said threshold setting or a predetermined value of said current wherein said timer remains asserted until said phasor difference stays below said threshold setting or said predetermined value for a period of time equal to the setting of said timer means; and
   asserting an output if said predetermined value is exceeded.

14. The method of claim 13 further including receiving all three phase currents and summing said phase currents to determine said residual current.

15. The method of claim 13 further including separating a first power system from a second power system if a system separation signal is received during the time said output is asserted.

16. An apparatus for detecting a power system disturbance, comprising:
   means for receiving at least one phase current or a residual current of a power system;
   means for converting the current into a current phasor; means for determining the rate of change of said current phasor, said determining means includes means for determining a phasor difference between the present value of said current and a value of said current of a predetermined earlier time;
   means for comparing the rate of change to a predetermined value; and
   means for asserting an output if the predetermined value is exceeded.

17. The apparatus of claim 16 further including means for scaling down and sampling said current.

18. The apparatus of claim 17 further including means for converting said current to digital data and digital filter means for removing selected components from said digital data.

19. A method for detecting a power system disturbance, comprising:
   receiving at least one phase current or a residual current of a power system;
   converting the current into a current phasor;
   determining a phasor difference between the present value of said phasor current and a value of said phasor current of a predetermined earlier time;
   comparing the rate of change to a predetermined value; and
   asserting an output if the predetermined value is exceeded.

20. The method of claim 19 further including receiving all three phase currents and summing said phase currents to determine said residual current.

21. The method of claim 20 further including separating a first power system from the second power system if a system separation signal is received during the time said output is asserted.

* * * * *

UNITED STATES PATENT AND TRADEMARK OFFICE
CERTIFICATE OF CORRECTION

PATENT NO. : 5,115,226
DATED : May 19, 1992
INVENTOR(S) : Edmund O. Schweitzer, III It is certified that error appears in the above-indentified patent and that said Letters Patent is hereby corrected as shown below:

Column 13:

In claim 11, line 7, change "detection" to "detecting".

In Column 14, claim 16:

In line 7-8, change "includes" to read "including";

In line 9, between "said" and "current", insert "phasor";

In line 10, between "said" and "current", insert "phasor"; and

In line 10, between "current" and "a", delete "of" and insert "at".

Signed and Sealed this

Nineteenth Day of October, 1993

Attest:

BRUCE LEHMAN

*Attesting Officer*      *Commissioner of Patents and Trademarks*